United States Patent
Zhang et al.

(10) Patent No.: US 12,537,761 B2
(45) Date of Patent: Jan. 27, 2026

(54) ROUTE SELECTION METHOD AND RELATED DEVICE

(71) Applicant: HUAWEI TECHNOLOGIES CO., LTD., Guangdong (CN)

(72) Inventors: Ka Zhang, Beijing (CN); Bin Wang, Beijing (CN); Juan Zheng, Nanjing (CN); Li Fan, Beijing (CN); Sheng Fang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 18/762,115

(22) Filed: Jul. 2, 2024

(65) Prior Publication Data

US 2024/0356839 A1   Oct. 24, 2024

Related U.S. Application Data

(63) Continuation of application No. PCT/CN2022/140543, filed on Dec. 21, 2022.

(30) Foreign Application Priority Data

Jan. 5, 2022 (CN) .......................... 202210005282.9
Mar. 1, 2022 (CN) .......................... 202210197494.1

(51) Int. Cl.
*H04L 45/00* (2022.01)
*H04L 45/24* (2022.01)
*H04L 45/745* (2022.01)

(52) U.S. Cl.
CPC .............. *H04L 45/34* (2013.01); *H04L 45/24* (2013.01); *H04L 45/745* (2013.01)

(58) Field of Classification Search
None
See application file for complete search history.

(56) References Cited

U.S. PATENT DOCUMENTS 10,230,605 B1    3/2019  Filsfils et al.
12,231,288 B2 *  2/2025  Chen ....................... H04L 45/46
(Continued)

FOREIGN PATENT DOCUMENTS

CN    113542123 A    10/2021
JP    2007251792 A    9/2007

OTHER PUBLICATIONS

Previdi Huawei Technologies C Filsfils K Talaulikar S et al: "Advertising Segment Routing Policies in BGP draft-ietf-idr-segmentrouting-te-policy-14; draft-ietf-idr-segment-routing-te-policy-14.txt", Advertising Segment Routing Policies in BGP Draft-IETF. IDR-Segment-Routing-TE-Policy-14; Draft-IETF-IDR-SegmentRouting-TE-Policy-14.txt; Internet-Draft: NetworkWorking Group, Internet Engineering TAno. 14 Nov. 11, 2021 (Nov. 11, 2021), pp. 1-44, XP015148864.

(Continued)

*Primary Examiner* — Quang N Nguyen
(74) *Attorney, Agent, or Firm* — WOMBLE BOND DICKINSON (US) LLP

(57) ABSTRACT

This application discloses a route selection method and a related device. A control entity determines first metric information of a first segment routing (SR) path, generates a first border gateway protocol (BGP) update message including the first metric information, and sends the first BGP update message to an ingress node of the first SR path, where the first metric information represents quality of the first SR path, the first metric information is used for route selection on a plurality of paths, each of the plurality of paths has a same IP prefix of a destination node, and the plurality of paths include the first SR path. According to the method, the control entity can send, to the ingress node of the SR path by using the BGP update message, the metric information that represents the quality of the SR path.

26 Claims, 15 Drawing Sheets

(56) References Cited

U.S. PATENT DOCUMENTS

| | | | |
|---|---|---|---|
| 2020/0162365 A1 | 5/2020 | Liu et al. | |
| 2021/0258249 A1* | 8/2021 | Torvi | H04L 45/566 |
| 2021/0385150 A1* | 12/2021 | Shrivastava | H04L 45/34 |
| 2022/0141120 A1* | 5/2022 | Dong | H04L 45/50 |
| | | | 370/401 |
| 2022/0303212 A1* | 9/2022 | Chan | H04L 45/04 |
| 2022/0393936 A1* | 12/2022 | Chen | H04L 45/58 |
| 2025/0080451 A1* | 3/2025 | Gamage | H04L 45/50 |

OTHER PUBLICATIONS

Zhang J Dong Huawei K: "BGP SR Policy Extensions for metric draftzhang-idr-sr-policy-metric-00; draft-zhang-idr-sr-policy-metric-00.txt", BGP SR Policy Extensions for Metric Draft-Zhang-IDR-SRPolicy-Metric-00; Draft-Zhang-IDR-SR-Policy-Metric-00.txt; Internet-Draft: Network Working Group, Internet Engineering Task Force, IETF; Standard Mar. 5, 2022(Mar. 5, 2022), pp. 1-7, XP015150616.
C.Filsfils, Ed et al:"IPv6 Segment Routing Header (SRH)", RFC 8754 Mar. 2020 total 27 pages.

* cited by examiner

Candidate path sub-TLV field/Segment list sub-TLV field:

| Type (Type) | Length (Length) | Metric type (Metric Type) | Flags (Flags) |
|---|---|---|---|
| Metric value (Metric Value) ||||

ROUTE SELECTION METHOD AND RELATED DEVICE

CROSS-REFERENCE TO RELATED APPLICATIONS

This application is a continuation of International Application No. PCT/CN2022/140543, filed on Dec. 21, 2022, which claims priority to Chinese Patent Application No. 202210005282.9, filed on Jan. 5, 2022 and Chinese Patent Application No. 202210197494.1, filed on Mar. 1, 2022. All of the aforementioned patent applications are hereby incorporated by reference in their entireties.

TECHNICAL FIELD

This application relates to the field of communication technologies, and in particular, to a route selection method and a related device.

BACKGROUND

Currently, a control entity can compute a segment routing (SR) path and send path information of the SR path to an ingress node of the SR path. In this way, the ingress node of the SR path can encapsulate a received packet based on the path information, and transmit the packet through the SR path. In a network with SR paths, a route selection node for route selection needs to perform proper route selection based on an expectation of a user.

SUMMARY

Based on this, embodiments of this application provide a route selection method and a related device. A control entity can send, to an ingress node of an SR path by using a border gateway protocol update (BGP update) message, metric information that represents quality of the SR path, so that a route selection node can perform proper route selection based on the metric information of the SR path.

According to a first aspect, this application provides a route selection method. In the method, a control entity determines first metric information of a first SR path, generates a first BGP update message including the first metric information, and sends the first BGP update message to an ingress node of the first SR path (namely, a first network device), where the first metric information can represent quality of the first SR path, the first metric information is used for route selection on a plurality of paths, each of the plurality of paths has a same internet protocol (IP) prefix of a destination node, and the plurality of paths include the first SR path. It can be learned that in the method, the control entity can send, to the ingress node of the SR path by using the BGP update message, the metric information that represents the quality of the SR path, so that the ingress node of the SR path knows the metric information of the SR path when obtaining path information of the SR path by using the BGP update message. In this way, a route selection node for the route selection can perform, based on the quality of the SR path, proper route selection on routes that are iterated to the plurality of paths including the SR path, so that the route selection can meet an expectation of a user for the route selection.

In this application, the metric information is a quality attribute of a path, and represents quality of the path, or may be considered to represent a cost of the path. The metric information may include but is not limited to at least one of the following information: an interior gateway protocol (IGP) metric, a traffic engineering (TE) metric, a delay, or a packet loss rate. For example, if the metric information is the TE metric, a smaller value of the TE metric indicates better quality of the path, or otherwise, a larger value of the TE metric indicates poorer quality of the path. For another example, if the metric information is the delay, a smaller value of the delay indicates better quality of the path, or otherwise, a larger value of the delay indicates poorer quality of the path. In this embodiment of this application, the BGP update message is extended to carry the metric information of the SR path. It should be noted that, in the method provided in this embodiment of this application, the BGP update message may alternatively carry a plurality of types of metric information. In this case, a corresponding route selection policy may be configured on the route selection node. For example, priorities of the plurality of types of metric information are configured. When high-priority metric information is the same, low-priority metric information is then considered.

In this embodiment of this application, the route selection is that the route selection node selects the plurality of routes that correspond to an IP prefix and that are to the destination node, and the route selection node generates the forwarding entry based on the selected route, to guide transmission of a service packet. The plurality of routes from the route selection node to the destination node have the same IP prefix, and next hops may be the same or different. The next hops of the plurality of routes from the route selection node to the destination node may be iterated to different paths. Therefore, the route selection may also be understood as selection of the different paths to which the next hops of the plurality of routes are iterated. However, a route corresponding to the IP prefix from the route selection node to the destination node may be understood as a route corresponding to a path (for example, an SR policy) from the route selection node to the destination node.

The SR path may be an SR policy, where for example, the SR policy may be a segment routing over internet protocol version 6 (SRv6) policy or a segment routing multi-protocol label switching (SR MPLS) policy; or the SR path may be a segment routing-traffic engineering tunnel (SR-TE Tunnel).

It should be noted that in embodiments of this application, the network device and the node have a same meaning, and may be alternately understood and used. The network device may be a communication device that has a packet forwarding function, such as a switch, a router, a virtual routing device, or a virtual forwarding device. In one case, the control entity may be an independently disposed controller, a network manager, or a route reflector (RR). Alternatively, in another case, the control entity may be a network device that has a function of the control entity in embodiments of this application. For ease of understanding and description, the following provides descriptions by using an example in which the control entity is the controller.

In some embodiments, in a scenario in which the first network device is the ingress node of the first SR path, and is also an ingress node of a second SR path, the method may further include: The control entity determines second metric information of the second SR path, where the second metric information represents quality of the second SR path. The control entity generates a second BGP update message, where the second BGP update message includes the second metric information, the second metric information is used for route selection on the plurality of paths, and the plurality of paths include the second SR path. The control entity sends the second BGP update message to the first network device, where the first network device is the ingress node of the second SR path.

As an example, if an egress node of the first SR path may be a second network device, and an egress node of the second SR path may be a third network device, next hops of routes that correspond to the IP prefix and that are to the destination node may include the second network device and the third network device, the plurality of paths may include a first path and a second path, the first path includes the first SR path, and the second path includes the second SR path.

As another example, if an egress node of the first SR path and an egress node of the second SR path may be both a second network device, a next hop of a route that corresponds to the IP prefix and that is to the destination node may include the second network device, the plurality of paths include a first path and a second path, the first path includes the first SR path, and the second path includes the second SR path.

In this example, the first metric information is used by the first network device to perform route selection on the plurality of paths. In this case, the first path may include only the first SR path, and the second path may include only the second SR path.

In another case, the first network device is connected to a fourth network device, and the first metric information is used by the fourth network device to perform route selection on the plurality of paths. In this case, if the first path may further include a first segment path from the fourth network device to the first network device, metric information of the first path includes the first metric information and third metric information of the first segment path.

In some embodiments, in a scenario in which the first network device is the ingress node of the first SR path and the fifth network device is an ingress node of the third SR path, the method may further include: The control entity determines fourth metric information of the third SR path, where the fourth metric information represents quality of the third SR path. The control entity generates a third BGP update message, where the third BGP update message includes the fourth metric information, the fourth metric information is used for route selection on the plurality of paths, and the plurality of paths include the third SR path. The control entity sends the third BGP update message to a fifth network device, where the fifth network device is the ingress node of the third SR path.

As an example, if an egress node of the first SR path may be a second network device, and an egress node of the third SR path may be a third network device, next hops of routes that correspond to the IP prefix and that are to the destination node may include the second network device and the third network device, the plurality of paths include a first path and a third path, the first path includes the first SR path, and the third path includes the third SR path. In one case, the first network device and the fifth network device are both connected to a fourth network device, and the first metric information is used by the fourth network device to perform route selection on the plurality of paths.

The first path may further include a first segment path from the fourth network device to the first network device, and the third path may further include a second segment path from the fourth network device to the fifth network device. In this case, fifth metric information of the first path includes the first metric information and sixth metric information of the first segment path, seventh metric information of the third path includes the fourth metric information and eighth metric information of the second segment path, and the fifth metric information and the seventh metric information are used by the fourth network device to perform route selection on the first path and the third path.

In some embodiments, if a type of the first SR path is an SR policy, the first BGP update message is a BGP SR policy packet.

As an example, the first SR path includes at least one candidate path, and the first metric information includes metric information of a working path in the at least one candidate path. The first metric information may be carried in a candidate path sub-type-length-value (Sub-TLV) field corresponding to the working path in the BGP SR policy packet. In this case, for example, that a control entity determines first metric information of a first segment routing SR path may include: The control entity obtains metric information corresponding to at least one segment list of a working path in the first SR path. The control entity determines the first metric information based on the metric information corresponding to the at least one segment list, where the first metric information may be a maximum value in the metric information corresponding to the at least one segment list segment list.

As another example, the first SR path includes at least one candidate path, a working path in the at least one candidate path includes at least one segment list, and the first metric information includes metric information corresponding to each of the at least one segment list. The first metric information may be carried in a segment list sub-type-length-value (Sub-TLV) field corresponding to each segment list in the BGP SR policy packet.

In some embodiments, if a type of the first SR path may be an SR-TE tunnel, the BGP update message may be a BGP SR-TE tunnel packet.

According to a second aspect, this application further provides a route selection method. The method is applied to a first network device, and the first network device is an ingress node of a first SR, and is also a node having a path selection function. For example, the method may include: The first network device obtains a first BGP update message generated by a control entity, where the first BGP update message includes first metric information of a first SR path, and the first metric information represents quality of the first SR path. Then, the first network device performs route selection on a plurality of paths to a destination node based on the first metric information, where each of the plurality of paths has a same internet protocol IP prefix of the destination node, and the plurality of paths include the first SR path. It can be learned that in the method, the ingress node of the SR path (namely, the first network device) knows the metric information of the SR path when obtaining path information of the SR path by using the BGP update message. In this way, the first network device can perform, based on the quality of the SR path, proper route selection on routes that are iterated to the plurality of paths including the SR path, so that the route selection can meet an expectation of a user for the route selection.

In some embodiments, if the first network device is still an ingress node of a second SR path, the method may further include: The first network device obtains a second BGP update message generated by the control entity, where the second BGP update message includes second metric information of the second SR path, and the second metric information represents quality of the second SR path. In this way, that the first network device performs route selection on a plurality of paths to a destination node based on the first metric information may include: The first network device performs route selection on the plurality of paths to the destination node based on the first metric information and the second metric information, where the plurality of paths further include the second SR path.

As an example, for example, that the first network device performs route selection on the plurality of paths to the destination node based on the first metric information and the second metric information may include: The first network device associates, with the first SR path, a first route corresponding to the IP prefix, so that third metric information of the first route includes the first metric information. The first network device associates, with the second SR path, a second route corresponding to the IP prefix, so that fourth metric information of the second route includes the second metric information. In this way, the first network device selects the first route from the first route and the second route based on the third metric information and the fourth metric information, where a forwarding entry corresponding to the first route is used to guide packet forwarding from the first network device to the destination node, quality that is of a first path and that is represented by the third metric information is better than quality that is of a second path and that is represented by the fourth metric information, the plurality of paths include the first path and the second path, the first path includes the first SR path, and the second path includes the second SR path.

In some embodiments, if a type of the first SR path is an SR policy, the BGP update message is a BGP SR policy packet. If the first SR path includes at least one candidate path, the first metric information includes metric information of a working path in the at least one candidate path.

As an example, the first metric information is carried in a candidate path sub-TLV field corresponding to the working path in the BGP SR policy packet.

As another example, the first SR path includes at least one candidate path, a working path in the at least one candidate path includes at least one segment list segment list, and the first metric information includes metric information corresponding to each of the at least one segment list. In this case, the first metric information may be carried in a segment list sub-TLV field corresponding to each segment list in the BGP SR policy packet. In this example, the method provided in this application may further include: The first network device determines fifth metric information based on the first metric information, where the fifth metric information is metric information of a working path in the first SR path, and the fifth metric information is a maximum value in the metric information that corresponds to the at least one segment list segment list and that is included in the first metric information. In this case, that the first network device performs route selection on a plurality of paths to a destination node based on the first metric information may include: The first network device performs route selection on the plurality of paths to the destination node based on the fifth metric information.

In some embodiments, if a type of the first SR path may be an SR-TE tunnel, the BGP update message is a BGP SR-TE tunnel packet.

The first metric information includes at least one of the following information: an IGP metric, a TE metric, a delay, or a packet loss rate.

According to a third aspect, this application further provides a route selection method. The method is applied to a first network device. The first network device may be an ingress node of a first SR path, but the first network device may not be used as a route selection node for route selection. For example, the method includes: The first network device obtains a first BGP update message generated by a control entity, where the first BGP update message includes first metric information of a first SR path, the first metric information represents quality of the first SR path, the first metric information is used for route selection on a plurality of paths to a destination node, each of the plurality of paths has a same internet protocol IP prefix of the destination node, and the plurality of paths include the first SR path. Then, the first network device floods the first metric information. It can be learned that in the method, the ingress node of the SR path knows the metric information of the SR path when obtaining path information of the SR path by using the BGP update message, and floods the metric information of the SR path in a network, so that the route selection node for the route selection can notify the metric information of the SR path. In this way, the route selection node for the route selection can perform, based on the quality of the SR path, proper route selection on routes that are iterated to the plurality of paths including the SR path, so that the route selection can meet an expectation of a user for the route selection.

As an example, that the first network device floods the first metric information may include: The first network device floods the first metric information according to an IGP.

In some embodiments, the first metric information is used by a second network device to perform route selection on the plurality of paths to the destination node, and the second network device is connected to the first network device. In this case, the second network device is the route selection node for the route selection.

As an example, the plurality of paths further include a second SR path, an ingress node of the second SR path is the first network device, and the method may further include: The first network device obtains a second BGP update message generated by the control entity, where the second BGP update message includes second metric information of the second SR path, the second metric information represents quality of the second SR path, and the second metric information is used for route selection on the plurality of paths to the destination node. Then, the first network device floods the second metric information.

In some embodiments, if a type of the first SR path is an SR policy, the BGP update message is a BGP SR policy packet. If the first SR path includes at least one candidate path, the first metric information includes metric information of a working path in the at least one candidate path.

As an example, the first metric information may be carried in a candidate path sub-TLV field corresponding to the working path in the BGP SR policy packet.

As another example, the first SR path includes at least one candidate path, a working path in the at least one candidate path includes at least one segment list segment list, and the first metric information includes metric information corresponding to each of the at least one segment list. In this case, the first metric information may be carried in a segment list sub-TLV field corresponding to each segment list in the BGP SR policy packet. In this example, the method may further include: The first network device determines third metric information based on the first metric information, where the third metric information is metric information of a working path in the first SR path, the third metric information is a maximum value in the metric information that corresponds to the at least one segment list and that is included in the first metric information, and the third metric information is used for the route selection.

In some embodiments, if a type of the first SR path is an SR-TE tunnel, the BGP update message is a BGP SR-TE tunnel packet.

The first metric information includes at least one of the following information: an IGP metric, a TE metric, a delay, or a packet loss rate.

According to a fourth aspect, this application further provides a route selection apparatus. The apparatus is used in a control entity, and the apparatus may include: a first determining unit, a first generation unit, and a first sending unit. The first determining unit is configured to determine first metric information of a first segment routing SR path, where the first metric information represents quality of the first SR path. The first generation unit is configured to generate a first border gateway protocol update BGP update message, where the first BGP update message includes the first metric information, the first metric information is used for route selection on a plurality of paths, each of the plurality of paths has a same internet protocol IP prefix of a destination node, and the plurality of paths include the first SR path. The first sending unit is configured to send the first BGP update message to a first network device, where the first network device is an ingress node of the first SR path.

In some embodiments, the apparatus may further include: a second determining unit, a second generation unit, and a second sending unit. The second determining unit is configured to determine second metric information of a second SR path, where the second metric information represents quality of the second SR path. The second generation unit is configured to generate a second BGP update message, where the second BGP update message includes the second metric information, the second metric information is used for route selection on the plurality of paths, and the plurality of paths include the second SR path. The second sending unit is configured to send the second BGP update message to the first network device, where the first network device is an ingress node of the second SR path.

As an example, if an egress node of the first SR path is a second network device, and an egress node of the second SR path is a third network device, next hops of routes corresponding to the IP prefix include the second network device and the third network device, the plurality of paths include a first path and a second path, the first path includes the first SR path, and the second path includes the second SR path.

As another example, if an egress node of the first SR path and an egress node of the second SR path are both a second network device, a next hop of a route corresponding to the IP prefix includes the second network device, the plurality of paths include a first path and a second path, the first path includes the first SR path, and the second path includes the second SR path.

In one case, the first metric information is used by the first network device to perform route selection on the plurality of paths.

In another case, the first network device is connected to a fourth network device, and the first metric information is used by the fourth network device to perform route selection on the plurality of paths. In this case, if the first path further includes a first segment path from the fourth network device to the first network device, metric information of the first path includes the first metric information and third metric information of the first segment path.

In some embodiments, the apparatus may further include: a third determining unit, a third generation unit, and a third sending unit. The third determining unit is configured to determine fourth metric information of a third SR path, where the fourth metric information represents quality of the third SR path. The third generation unit is configured to generate a third BGP update message, where the third BGP update message includes the fourth metric information, the fourth metric information is used for route selection on the plurality of paths, and the plurality of paths include the third SR path. The third sending unit is configured to send the third BGP update message to a fifth network device, where the fifth network device is an ingress node of the third SR path.

As an example, if an egress node of the first SR path is a second network device, and an egress node of the third SR path is a third network device, next hops of routes corresponding to the IP prefix include the second network device and the third network device, the plurality of paths include a first path and a third path, the first path includes the first SR path, and the third path includes the third SR path.

As another example, the first network device and the fifth network device are both connected to a fourth network device, and the first metric information is used by the fourth network device to perform route selection on the plurality of paths. If the first path further includes a first segment path from the fourth network device to the first network device, and the third path further includes a second segment path from the fourth network device to the fifth network device, fifth metric information of the first path includes the first metric information and sixth metric information of the first segment path, seventh metric information of the third path includes the fourth metric information and eighth metric information of the second segment path, and the fifth metric information and the seventh metric information are used by the fourth network device to perform route selection on the first path and the third path.

In some embodiments, if a type of the first SR path is a segment routing policy SR policy, the first BGP update message is a BGP SR policy packet. If the first SR path includes at least one candidate path, the first metric information includes metric information of a working path in the at least one candidate path.

As an example, the first metric information is carried in a candidate path sub-TLV field corresponding to the working path in the BGP SR policy packet. In this case, the first determining unit may include: an obtaining subunit and a determining subunit. The obtaining subunit is configured to obtain metric information corresponding to at least one segment list segment list of a working path in the first SR path. The determining subunit is configured to determine the first metric information based on the metric information corresponding to the at least one segment list segment list.

The first metric information is a maximum value in the metric information corresponding to the at least one segment list segment list.

As another example, the first SR path includes at least one candidate path, a working path in the at least one candidate path includes at least one segment list segment list, and the first metric information includes metric information corresponding to each of the at least one segment list. In this case, the first metric information is carried in a segment list sub-TLV field corresponding to each segment list in the BGP SR policy packet.

In some embodiments, if a type of the first SR path is an SR-TE tunnel, the BGP update message is a BGP SR-TE tunnel packet.

The first metric information includes at least one of the following information: an IGP metric, a TE metric, a bandwidth, a delay delay, or a loss rate.

It should be noted that for examples and achieved technical effects of the apparatus provided in this application, refer to the method provided in the first aspect.

According to a fifth aspect, this application provides a route selection apparatus. The apparatus is used in a first network device, and the apparatus may include: a first obtaining unit and a route selection unit. The first obtaining unit is configured to obtain a first BGP update message generated by a control entity, where the first BGP update message includes first metric information of a first segment routing SR path, and the first metric information represents quality of the first SR path. The route selection unit is configured to perform route selection on a plurality of paths to a destination node based on the first metric information, where each of the plurality of paths has a same internet protocol IP prefix of the destination node, and the plurality of paths include the first SR path.

In some embodiments, the apparatus may further include: a second obtaining unit. The second obtaining unit is configured to obtain a second BGP update message generated by the control entity, where the second BGP update message includes second metric information of a second SR path, and the second metric information represents quality of the second SR path. In this case, the route selection unit is configured to: perform route selection on the plurality of paths to the destination node based on the first metric information and the second metric information, where the plurality of paths further include the second SR path.

As an example, the route selection unit is configured to: associate, with the first SR path, a first route corresponding to the IP prefix, so that third metric information of the first route includes the first metric information; associate, with the second SR path, a second route corresponding to the IP prefix, so that fourth metric information of the second route includes the second metric information; and select the first route from the first route and the second route based on the third metric information and the fourth metric information, where a forwarding entry corresponding to the first route is used to guide packet forwarding from the first network device to the destination node, quality that is of a first path and that is represented by the third metric information is better than quality that is of a second path and that is represented by the fourth metric information, the plurality of paths include the first path and the second path, the first path includes the first SR path, and the second path includes the second SR path.

In some embodiments, if a type of the first SR path is an SR policy, the BGP update message is a BGP SR policy packet.

In some embodiments, if a type of the first SR path is an SR-TE tunnel, the BGP update message is a BGP SR-TE tunnel packet.

The first metric information includes at least one of the following information: an IGP metric, a TE metric, a bandwidth, a delay delay, or a loss rate.

It should be noted that for examples and achieved technical effects of the apparatus provided in this application, refer to the method provided in the second aspect.

According to a sixth aspect, this application provides a route selection apparatus. The apparatus is used in a first network device, and the apparatus may include: a first obtaining unit and a first flooding unit. The first obtaining unit is configured to obtain a first border gateway protocol update BGP update message generated by a control entity, where the first BGP update message includes first metric information of a first segment routing SR path, the first metric information represents quality of the first SR path, the first metric information is used for route selection on a plurality of paths to a destination node, each of the plurality of paths has a same internet protocol IP prefix of the destination node, and the plurality of paths include the first SR path. The first flooding unit is configured to flood the first metric information.

As an example, the first flooding unit is configured to flood the first metric information according to an IGP.

As an example, the first metric information is used by a second network device to perform route selection on the plurality of paths to the destination node, and the second network device is connected to the first network device.

In some embodiments, the plurality of paths further include a second SR path, an ingress node of the second SR path is the first network device, and the apparatus may further include: a second obtaining unit and a second flooding unit. The second obtaining unit is configured to obtain a second BGP update message generated by the control entity, where the second BGP update message includes second metric information of the second SR path, the second metric information represents quality of the second SR path, and the second metric information is used for route selection on the plurality of paths to the destination node. The second flooding unit is configured to flood the second metric information.

In some embodiments, if a type of the first SR path is an SR policy, the BGP update message is a BGP SR policy packet.

In some embodiments, if a type of the first SR path is an SR-TE tunnel, the BGP update message is a BGP SR-TE tunnel packet.

The first metric information includes at least one of the following information: an IGP metric, a TE metric, a bandwidth, a delay delay, or a loss rate.

It should be noted that for examples and achieved technical effects of the apparatus provided in this application, refer to the method provided in the third aspect.

According to a seventh aspect, this application provides a control entity. The control entity includes a processor and a memory, the memory is configured to store instructions or program code, and the processor is configured to: invoke the instructions or the program code from the memory and run the instructions or the program code, to perform the method according to any one of the first aspect or embodiments of the first aspect.

According to an eighth aspect, this application provides a network device. The network device includes a processor and a memory, the memory is configured to store instructions or program code, and the processor is configured to: invoke the instructions or the program code from the memory and run the instructions or the program code, to perform the method according to any one of the second aspect or embodiments of the second aspect.

According to a ninth aspect, this application provides a network device. The network device includes a processor and a memory, the memory is configured to store instructions or program code, and the processor is configured to: invoke the instructions or the program code from the memory and run the instructions or the program code, to perform the method according to any one of the third aspect or embodiments of the third aspect.

According to a tenth aspect, this application provides a communication system. The communication system may include a first network device and a control entity. The first network device is configured to perform the method according to any one of the second aspect or embodiments of the second aspect. The control entity is configured to perform the method according to any one of the first aspect or embodiments of the first aspect. The first network device may be the route selection apparatus provided in the fifth aspect, and the control entity may be the route selection apparatus provided in the fourth aspect. Alternatively, the first network device is configured to perform the method according to any one of the third aspect or embodiments of the third aspect. The control entity is configured to perform the method according to any one of the first aspect or embodiments of the first aspect. The first network device may be the route selection apparatus provided in the sixth aspect, and the control entity may be the route selection apparatus provided in the fourth aspect.

According to an eleventh aspect, this application provides a computer-readable storage medium, including instructions, a program, or code. When the instructions, the program, or the code is executed on a computer, the computer is enabled to perform the method according to any one of the first aspect or embodiments of the first aspect, the method according to any one of the second aspect or embodiments of the second aspect, and the method according to any one of the third aspect or embodiments of the third aspect.

According to a twelfth aspect, this application provides a computer program product. When the computer program product runs on a network device, the network device is enabled to perform the method according to any one of the first aspect or embodiments of the first aspect, the method according to any one of the second aspect or embodiments of the second aspect, and the method according to any one of the third aspect or embodiments of the third aspect.

DESCRIPTION OF EMBODIMENTS

An SR path is used to guide forwarding of a packet on an SR path according to a source routing mechanism and by encapsulating an ordered segment list in an ingress node of the SR path. Usually, the segment list may be generated after a control entity performs path computation. In one case, the control entity may be a module having a path computation function in the ingress node of the SR path. In this case, the ingress node of the SR path may obtain, from the control entity, the segment list corresponding to the SR path. In another case, the control entity may alternatively be an independently deployed controller or a network management device. In this case, the controller or the network management device may include the segment list in a BGP update message or a path computation element communication protocol (PCECP) message, and send the segment list to the ingress node of the SR path according to a border gateway protocol (BGP) or PCECP.

When there are a plurality of routes from the route selection node to the same destination, the route selection node performs route selection according to a preset policy. Currently, the preset policy includes at least one of the following policies: a protocol preferred value in routes, a local route priority, preference of local routes, preference of a path with a small IGP metric, or preference of a route advertised by a router with a small router identifier (ID). If the preset policy includes the plurality of policies, the plurality of policies have priorities. For example, the preset policy includes the protocol preferred value in the routes and the local route priority. If the priority for the protocol preferred value in the routes is higher than the priority of the local route priority, during the route selection, a protocol preferred value in a plurality of routes is preferentially considered. If the two priorities are different, route selection is performed based on the protocol preferred value in the routes. If the two priorities are the same, the local route priority is considered, and route selection is performed based on the local route priority. In an actual scenario, the IGP metric of the path needs to be more considered during the route selection. In other words, when the protocol preferred value in the routes, the route priority, the local route, and the like in the preset policy are all the same, a path with a smallest IGP metric is selected. When the protocol preferred value in the routes, the route priority, the local route, the IGP metric, and the like in the preset policy are all the same, other route attributes are considered. For example, a route advertised by the network device with a smallest router ID is selected. In this case, a planning requirement for the network device is very high, and it is difficult to meet an expectation.

Figure 1A:
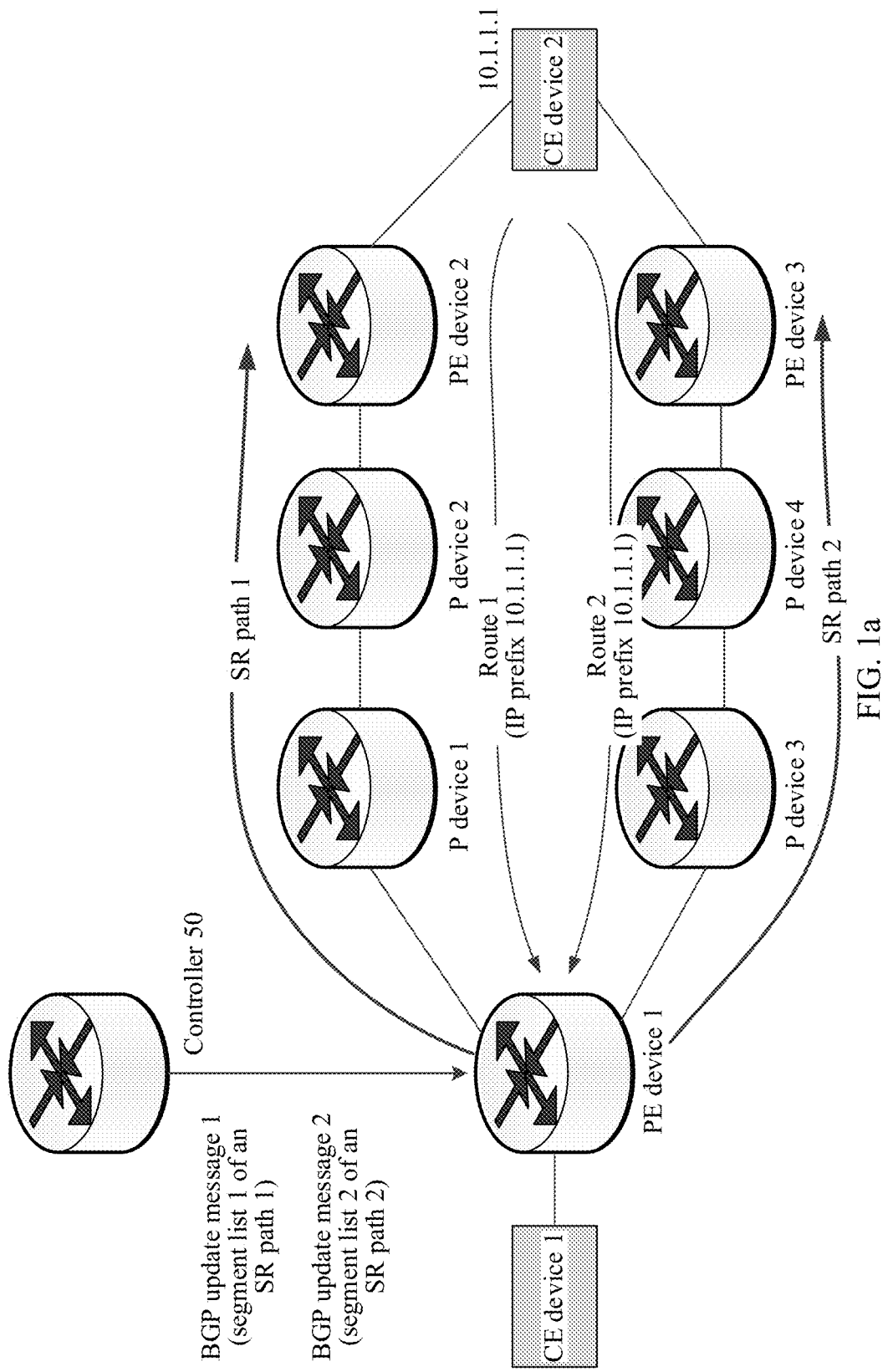
FIG. 1a is a schematic diagram of a structure of a network scenario according to this application.

A current route selection process is described by using a network shown in FIG. 1a as an example.

Refer to FIG. 1a. The network may include: a customer edge (CE) device 1, a CE device 2, a provider edge (PE) device 1, a PE device 2, a PE device 3, a provider (P) device 1, a P device 2, a P device 3, a P device 4, and a controller 50. The CE device 1 is connected to the PE device 1, the PE device 1 is connected to the PE device 2 via the P device 1 and the P device 2 in sequence, the PE device 1 is further connected to the PE device 3 via the P device 3 and the P device 4 in sequence, and the PE device 2 and the PE device 3 are both connected to the CE device 2. The CE device 1 is connected to the PE device 1. A path through which the PE device 1 is connected to the PE device 2 via the P device 1 and the P device 2 in sequence may be an SR path, recorded as an SR path 1. A path through which the PE device 1 is connected to the PE device 3 via the P device 3 and the P device 4 in sequence may be recorded as an SR path 2. Assuming that a prefix (referred to as an IP prefix below) of an internet protocol (IP) address of the CE device 2 is 10.1.1.1, and the CE device 2 may advertise, via the PE device 2 and the PE device 3, a route whose IP prefix is 10.1.1.1 in the network, the PE device 1 receives a route 1 whose IP prefix is 10.1.1.1 and advertised by the PE device 2 and a route 2 whose IP prefix is 10.1.1.1 and advertised by the PE device 3, where a next hop of the route 1 is the PE device 2, and a next hop of the route 2 is the PE device 3.

In the network shown in FIG. 1*a*, a current route selection manner may include, for example, that the routes from the PE device 1 to the CE device 2 include two next hops: the PE device 2 and the PE device 3. The controller 50 performs path computation and sends a BGP update message 1 and a BGP update message 2 to the PE device 1. The BGP update message 1 carries a segment list 1 of the SR path 1, the BGP update message 2 carries a segment list 2 of the SR path 2. The segment list 1 sequentially includes segment identifiers (SIDs) of the PE device 1, the P device 1, the P device 2, and the PE device 2, and the segment list 2 sequentially includes SIDs of the PE device 1, the P device 3, the P device 4, and the PE device 3. That is, the PE device 1 is an ingress node of the SR path 1 and the SR path 2, an egress node of the SR path 1 is the PE device 2, and an egress node of the SR path 2 is the PE device 3. Then, the route 1 from the PE device 1 to the CE device 2 is iterated to the SR path 1, and the route 2 from the PE device 1 to the CE device 2 is iterated to the SR path 2. It should be noted that there are a plurality of next hops in the routes from the PE device 1 to the CE device 2, and each next hop is iterated to a different SR path. Load sharing may be performed between different SR paths, or route selection may be performed according to a preset policy. It should be noted that this embodiment of this application relates to content of performing route selection on the routes including different SR paths. Then, the PE device 1 performs route selection according to the preset policy, for example, may perform route selection according to at least one of policies such as a protocol preferred value in routes, a local route priority, preference of local routes, preference of a path with a small IGP metric, or preference of a route advertised by a router with a small router identifier (ID), to select the route 1 whose next hop is the PE device 2 or the route 2 whose next hop is the PE device 3. Therefore, the PE device 1 generates a forwarding entry based on the selected route, to guide a packet that is received by the PE device 1 and whose value of a destination address field matches 10.1.1.1.

It can be learned that currently, the network device obtains only path information of the SR path by using the BGP update message, and cannot obtain quality of the SR path. That is, the BGP update message does not carry an attribute (referred to as metric information below) that can represent the quality of the SR path. As a result, the PE device 1 cannot know the quality of the SR path to which the route is to be iterated, and cannot select a high-quality route expected by a user.

Based on this, an embodiment of this application provides a route selection method, so that an ingress node of an SR path can know metric information of the SR path when obtaining path information of the SR path. In this way, a route selection node for route selection can perform, with reference to quality of the SR path, route selection on routes that are iterated to a plurality of paths including the SR path. For example, the method may include: A control entity determines first metric information that represents quality of a first SR path, generates a first BGP update message that carries the first metric information, and sends the first BGP update message to an ingress node of the first SR path (namely, the first network device). In one case, if the first network device has a route selection function, in other words, the first network device is a route selection node, the first network device obtains the first metric information of the first SR path from the received first BGP update message, and performs route selection on a plurality of paths to a destination node based on the first metric information, where each of the plurality of paths has a same IP prefix of the destination node, and the plurality of paths include the first SR path. In another case, if the first network device is not a route selection node, the first network device floods the first metric information, and the route selection node performs route selection on a plurality of paths to a destination node based on the received first metric information, where each of the plurality of paths has a same IP prefix of the destination node, and the plurality of paths include the first SR path. It can be learned that according to the method, the control entity can send, to the ingress node of the SR path by using the BGP update message, the metric information that represents the quality of the SR path, and the route selection node can perform, based on the metric information of the SR path, proper route selection on the plurality of paths including the SR path, so that the route selection can meet an expectation of the user for the route selection.

It should be noted that the metric information is a quality attribute of a path, and represents quality of the path, or may be considered to represent a cost of the path. The metric information may include but is not limited to at least one of the following information: an interior gateway protocol metric (IGP metric), a traffic engineering (TE) metric, a delay, or a packet loss rate. For example, if the metric information is the TE metric, a smaller value of the TE metric indicates better quality of the path, or otherwise, a larger value of the TE metric indicates poorer quality of the path. For another example, if the metric information is the delay, a smaller value of the delay indicates better quality of the path, or otherwise, a larger value of the delay indicates poorer quality of the path. In this embodiment of this application, the BGP update message is extended to carry the metric information of the SR path. For example, refer to related descriptions of FIG. 3 in a method 100. It should be noted that, in the method provided in this embodiment of this application, the BGP update message may alternatively carry a plurality of types of metric information. In this case, a corresponding route selection policy may be configured on the route selection node. For example, priorities of the plurality of types of metric information are configured. When high-priority metric information is the same, low-priority metric information is then considered.

It should be noted that in this embodiment of this application, the route selection is that the route selection node selects the plurality of routes that correspond to an IP prefix and that are to the destination node, and the route selection node generates the forwarding entry based on the selected route, to guide transmission of a service packet. The plurality of routes from the route selection node to the destination node have the same IP prefix, and next hops may be the same or different. The next hops of the plurality of routes from the route selection node to the destination node may be iterated to different paths. Therefore, the route selection may also be understood as selection of the different paths to which the next hops of the plurality of routes are iterated. However, a route corresponding to the IP prefix from the route selection node to the destination node may be understood as a route corresponding to a path (for example, an SR policy) from the route selection node to the destination node.

It should be noted that the SR path may be a segment routing policy (SR policy), where for example, the SR policy may be a segment routing over internet protocol version 6 policy (Segment Routing over Internet Protocol version 6 policy, SRv6 policy) or a segment routing multi-protocol label switching policy (SR MPLS policy); or the SR path may be a segment routing-traffic engineering tunnel (SR-TE Tunnel).

It should be noted that in embodiments of this application, the network device and the node have a same meaning, and may be alternately understood and used. The network device may be a communication device that has a packet forwarding function, such as a switch, a router, a virtual routing device, or a virtual forwarding device.

It should be noted that in embodiments of this application, in one case, the control entity may be an independently disposed controller, a network manager, or a route reflector (RR). Alternatively, in another case, the control entity may be a network device that has a function of the control entity in embodiments of this application. For ease of understanding and description, the following provides descriptions by using an example in which the control entity is the controller.

Figure 1B:
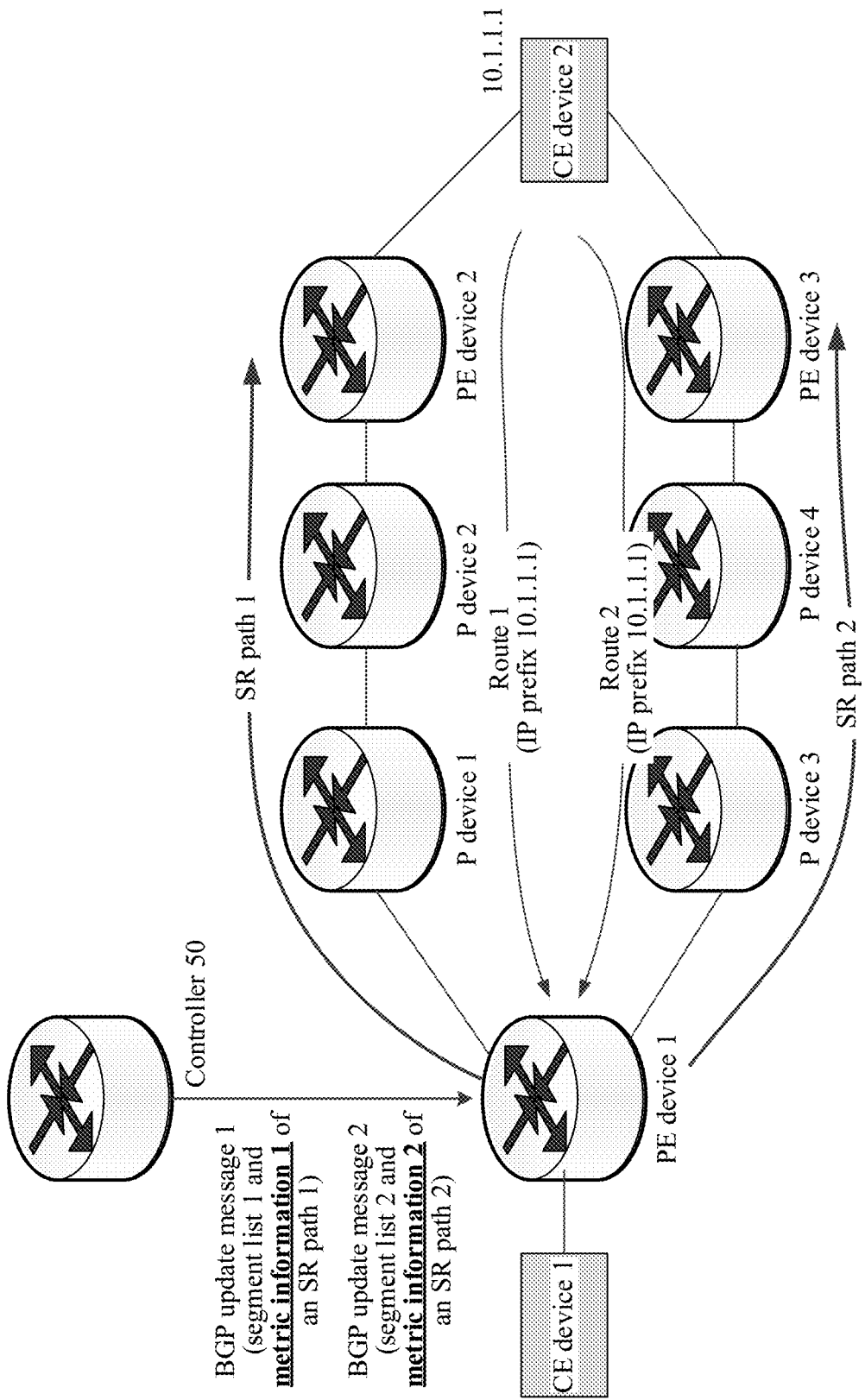
FIG. 1b is a schematic diagram of a structure of a network scenario according to this application.

A route selection method provided in embodiments of this application is described through the network shown in FIG. 1b. It should be noted that network structures in FIG. 1a and FIG. 1b are the same, and a difference lies in content carried in the BGP update message.

Assuming that an IP prefix of the CE device 2 is 10.1.1.1, and the CE device 2 may advertise, via the PE device 2 and the PE device 3, a route whose IP prefix is 10.1.1.1 in the network, the PE device 1 receives a route 1 whose IP prefix is 10.1.1.1 and advertised by the PE device 2 and a route 2 whose IP prefix is 10.1.1.1 and advertised by the PE device 3, where a next hop of the route 1 is the PE device 2, and a next hop of the route 2 is the PE device 3. That is, the routes from the PE device 1 to a destination node, namely, the CE device 2 include two next hops: the PE device 2 and the PE device 3. The controller 50 performs path calculation to determine an SR path 1 and an SR path 2, where ingress nodes of the SR path 1 and the SR path 2 are both the PE device 1, an egress node of the SR path 1 is the PE device 2, and an egress node of the SR path 2 is the PE device 3. Therefore, the controller 50 sends a BGP update message 1 and a BGP update message 2 to the PE device 1, where the BGP update message 1 carries a segment list 1 and metric information 1 of the SR path 1, the BGP update message 2 carries a segment list 2 and metric information 2 of the SR path 2, the metric information 1 represents quality of the SR path 1, and the metric information 2 represents quality of the SR path 2. Then, the PE device 1 iterates the route 1 to the CE device 2 to the SR path 1, so that the route 1 inherits the metric information 1 of the SR path 1, and the PE device 1 iterates the route 2 to the CE device 2 to the SR path 2, so that the route 2 inherits the metric information 2 of the SR path 2. Therefore, the PE device 1 selects, based on the metric information 1 of the route 1 and the metric information 2 of the route 2, the route 1 and the route 2 that are to the CE device 2, determines a route with better path quality, and generates a forwarding entry based on the selected route. For example, the quality of the SR path 1 indicated by the metric information 1 is better than the quality of the SR path 2 indicated by the metric information 2. In this case, when performing route selection, the PE device 1 selects the route 1, and generates a forwarding entry 1 based on the route 1. In this way, when receiving a packet whose destination address matches the IP prefix 10.1.1.1, the PE device 1 encapsulates, based on an indication of the forwarding entry 1, the segment list 1 of the SR path 1 into the packet, and forwards the encapsulated packet through the SR path 1. For another example, the quality of the SR path 2 indicated by the metric information 2 is better than the quality of the SR path 1 indicated by the metric information 1. In this case, when performing route selection, the PE device 1 selects the route 2, and generates a forwarding entry 2 based on the route 2. In this way, when receiving a packet whose destination address matches the IP prefix 10.1.1.1, the PE device 1 encapsulates, based on an indication of the forwarding entry 2, the segment list 2 of the SR path 2 into the packet, and forwards the encapsulated packet through the SR path 2.

In this way, when performing route selection on the plurality of paths to the destination node (where each of the plurality of paths has the same IP prefix of the destination node), the route selection node can select, based on an expectation of a user, a path with better quality (for example, a path with a lower delay, a lower packet loss rate, a smaller IGP metric, or a smaller TE metric). In addition, in the method, when the user has an expectation of a route selection result, the user may configure, on the controller 50, better metric information for the expected route selection result, so that after the controller 50 transmits the metric information to the route selection node, the route selection node can select, during route selection, a route that meets the expectation of the user. For example, if the user expects that the route selection result can be iterated to the SR path 1, metric information (for example, a TE metric) smaller than that of another path may be configured for the SR path 1, so that the controller 50 transfers the metric information to the route selection node, and the route selection node selects, based on the smaller metric information, the route 1 that is iterated to the SR path 1.

The foregoing describes embodiments of this application in a form of scenario embodiments. The following describes examples of embodiments of this application in detail with reference to FIG. 2 and FIG. 5. In a method 100 shown in FIG. 2, a first network device is an ingress node of a first SR path, and is also a route selection node that has a route selection function in the network. In a method 200 shown in FIG. 5, a first network device is an ingress node of a first SR path, but is not a route selection node that has a route selection function in the network.

Figure 2:
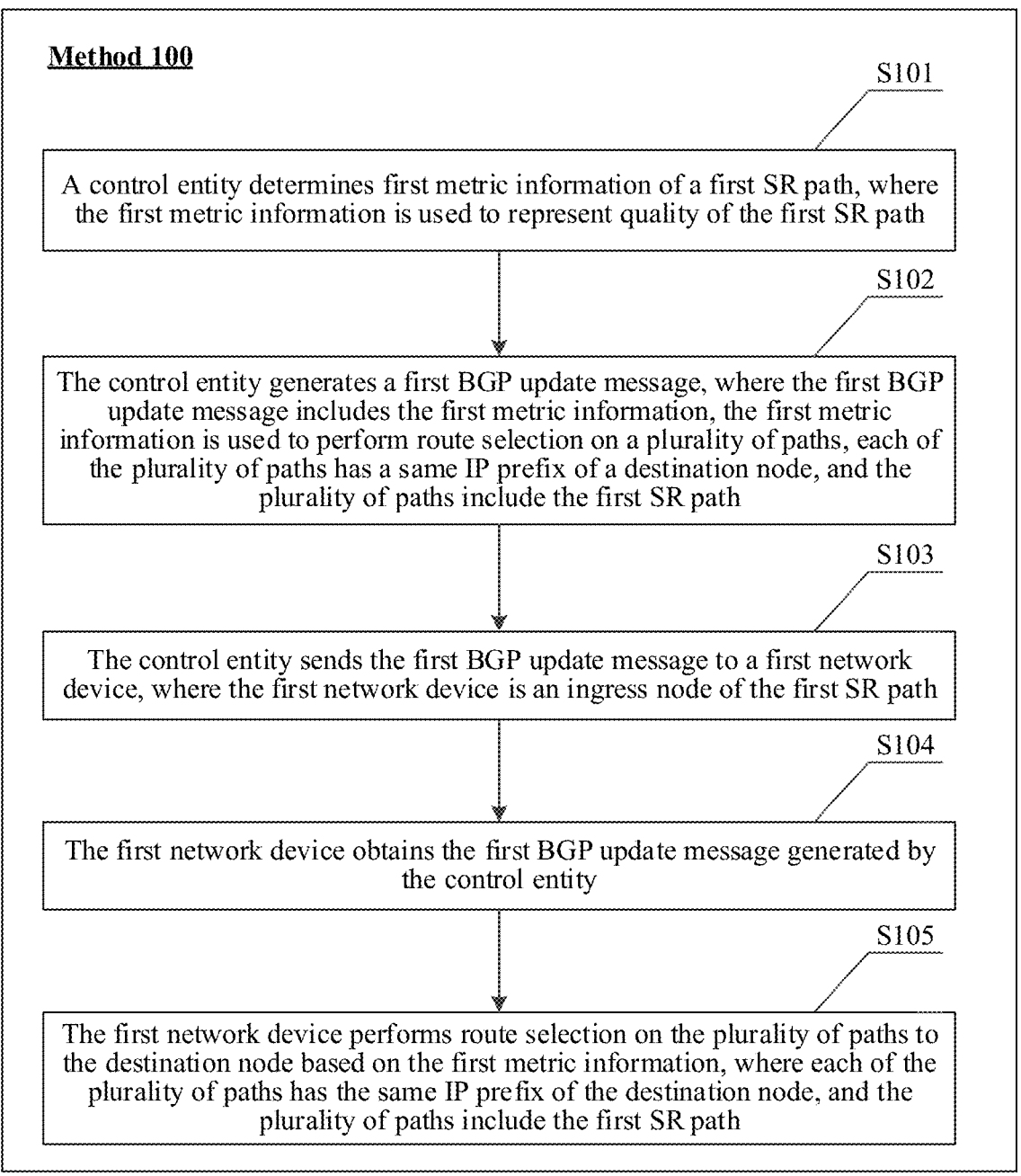
FIG. 2 is a schematic flowchart of a route selection method 100 according to this application.

FIG. 2 is a schematic flowchart of a route selection method 100 according to an embodiment of this application. To describe the method provided in embodiments of this application more clearly, the method 100 is described in a manner of interaction between a control entity and a first network device in a network. A first network device is an ingress node of a first SR path and a route selection node of the network. Correspondingly, in the network shown in FIG. 1a or FIG. Tb, the first network device may be the PE device 1, and the first SR path corresponds to the SR path 1 or the SR path 2. A control entity may be the controller 50 in the network shown in FIG. 2.

As shown in FIG. 2, the method 100 may include, for example, the following S101 to S105.

S101: The control entity determines first metric information of the first SR path, where the first metric information represents quality of the first SR path.

As an example, the control entity may collect a network topology, and obtain, through statistics collection, analysis, measurement, computation, and the like, a parameter value that can represent the quality of the first SR path and that is recorded as the first metric information. For example, a type of the first metric information may be an IGP metric, a TE metric, a delay, or a packet loss rate. A difference between the IGP metric and the TE metric lies in that the IGP metric is an actual path cost obtained by performing path computation based on a shortest path priority, and the TE metric may be set to a different value based on an expectation of a user.

S102: The control entity generates a first BGP update message, where the first BGP update message includes the first metric information, the first metric information is used for route selection on a plurality of paths, each of the plurality of paths has a same IP prefix of a destination node, and the plurality of paths include the first SR path.

Based on the type of the SR path, the control entity may generate different types of BGP update messages. As an example, if the type of the first SR path is a segment routing policy (SR policy), the first BGP update message is a BGP SR policy packet. As another example, if the type of the first SR path is an SR-TE tunnel, the first BGP update message is an SR-TE tunnel packet. It should be noted that in the BGP update message, whether the BGP update message is the BGP SR policy packet or the SR-TE tunnel packet may be indicated by using a subsequent address family identifier (SAFI) field. For example, if SAFI in the first BGP update message=73, it indicates that the first BGP update message is the BGP SR policy packet.

The control entity may extend the first BGP update message to carry the first metric information of the first SR path.

The first metric information and a manner of carrying the first metric information are described by using an example in which the first BGP update message is the first BGP SR policy packet.

The first SR path may include at least one candidate path, and there is only one working path in the at least one candidate path. The candidate path may be associated with at least one segment list, and a plurality of segment lists implement load balancing by using weight attributes (Weights) corresponding to the segment lists.

As an example, the first metric information in the first BGP SR policy packet may include metric information of the working path in the at least one candidate path. In this case, before S102, the method 100 further includes: The control entity obtains metric information corresponding to at least one segment list of a working path in the first SR path. Then, the control entity determines the first metric information based on the obtained metric information corresponding to the at least one segment list. For example, the control entity records a maximum value in the obtained metric information corresponding to the at least one segment list as the first metric information. Assuming that the working path in the first SR path is a candidate path 1, the candidate path 1 includes a segment list 1, a segment list 2, and a segment list 3, metric information 1 of the segment list 1 is 10, metric information 2 of the segment list 2 is 20, and metric information 3 of the segment list 3 is 5, metric information 4 of the candidate path 1 may be max{10, 20, 5}=20.

Weights of the segment list 1, the segment list 2, and the segment list 3 are a weight 1, a weight 2, and a weight 3 respectively.

For example, the first metric information may be carried in a candidate path sub-type-length-value (Candidate Path Sub-TLV) field corresponding to the working path in the first BGP SR policy packet. The first metric information of the first SR path carried in the first BGP SR policy packet is located in a tunnel encaps attribute (Tunnel Encaps Attribute) of SR policy network layer reachability information (NLRI). For example, related content of the first SR path in the first BGP SR policy packet may be as follows:

Candidate Path 1
        Metric information 4 of Candidate Path 1=20
        segment list 1
            Weight 1
        segment list 2
            Weight 2
        segment list 3
            Weight 3

Figures 3, 4A:
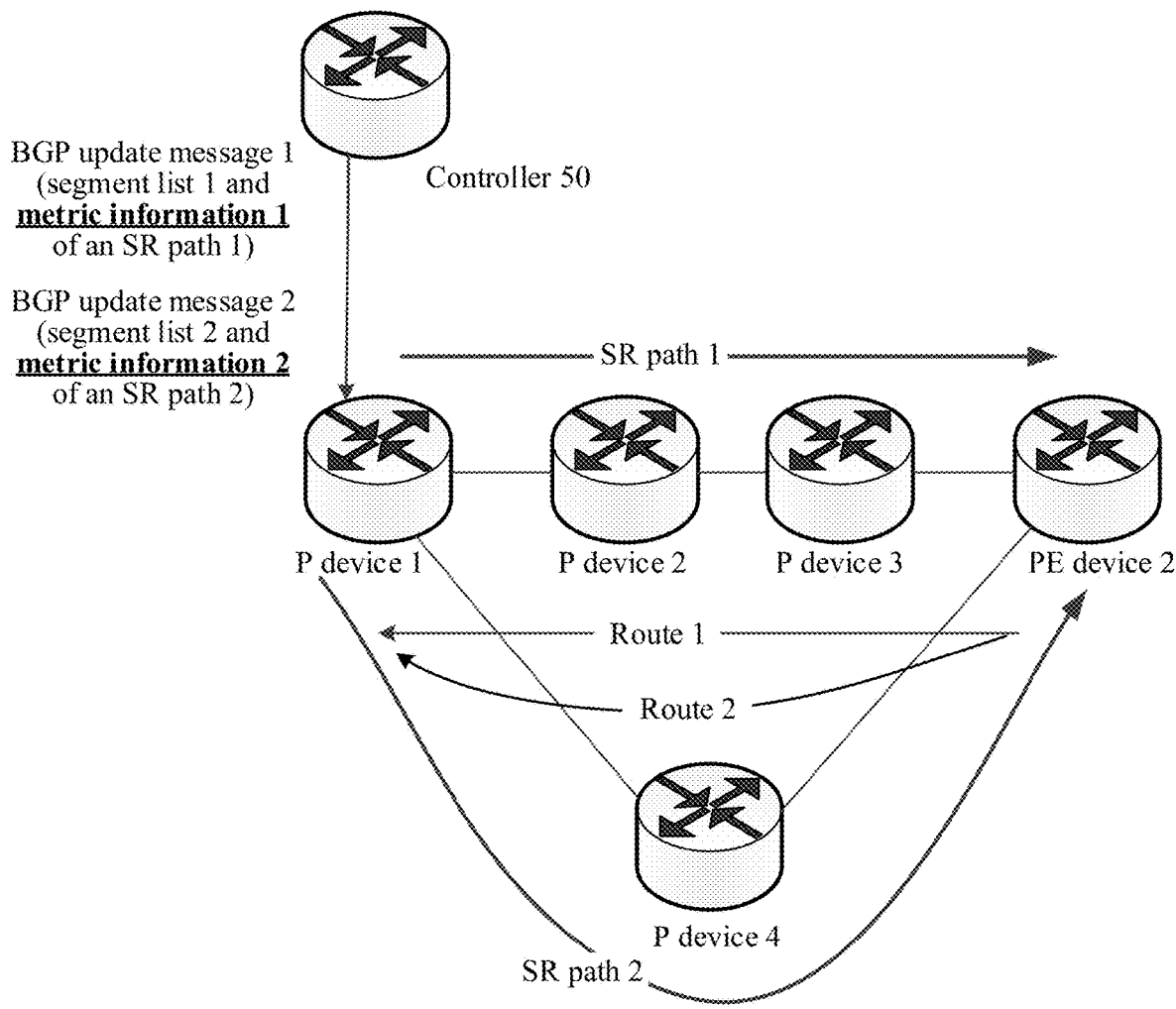
FIG. 3 is a schematic diagram of a sub-TLV field that carries metric information according to this application.
FIG. 4a is a schematic diagram of a structure of a network scenario according to this application.

For a format of the candidate path sub-TLV field, refer to FIG. 3. The candidate path sub-TLV field may include a type field, a length field, a metric type field, a flags field, and a metric value field. A value of the type field indicates that a type of sub-TLV is candidate path sub-TLV, and the type field is used to carry metric information of a candidate path. A value of the length field indicates a length of the candidate path sub-TLV field. If the metric information corresponds to different types, the length field may have different values. For example, for metric information of the IGP metric or the TE metric, the value of the length field may indicate that the length of the candidate path sub-TLV field is 6 bytes. A value of the metric type field indicates a type of metric information carried in the candidate path sub-TLV field, for example, may indicate that the metric information of the candidate path may be the IGP metric, the TE metric, the delay, or the packet loss rate. The flags field is not defined currently. A value of the metric value field is a value of the metric information of the candidate path. For example, metric type=IGP metric or TE metric, and metric value=20. For another example, metric type=delay, and metric value=10 milliseconds. For still another example, metric type=packet loss rate, and metric value=5%.

As another example, the working path in the at least one candidate path included in the first SR path may include at least one segment list, and the first metric information in the first BGP SR policy packet may include metric information corresponding to each segment list in the at least one segment list. The first metric information may include the metric information of the working path in the at least one candidate path. In this case, the first metric information may be carried in a segment list sub-type-length-value (Segment List Sub-TLV) field of each segment list corresponding to the working path in the first BGP SR policy packet. The first metric information of the first SR path carried in the first BGP SR policy packet is located in the tunnel encaps attribute of the SR policy NLRI. For example, related content of the first SR path in the first BGP SR policy packet may be as follows:

Candidate Path 1
        segment list 1
            Weight 1
            Metric information 1 of segment list 1=10
        segment list 2
            Weight 2
            Metric information 2 of segment list 2=20
        segment list 3

Weight 3
Metric information 3 of segment list 3=5

A format of the segment list sub-TLV field is the same as the format of the candidate path sub-TLV field shown in FIG. 3, and a difference may lie in: a value of a type field in the segment list sub-TLV field indicates that a type of sub-TLV field is segment list sub-TLV, and the type field is used to carry metric information of a segment list.

It should be noted that, in this example, the first metric information carried in the first BGP SR policy packet may be a set of metric information of at least one segment list. In this case, after obtaining the first metric information, the ingress node or the route selection node of the first SR path may determine, based on the first metric information, a value used to measure the quality of the first SR path, where the value is used as a parameter that directly reflects the quality of the first SR path.

As still another example, to enable the node that obtains the metric information of the first SR path to know both the quality of the working path and quality of each segment list, the first metric information in the first BGP SR policy packet may include metric information corresponding to each segment list in at least one segment list and metric information of the working path. For example, related content of the first SR path in the first BGP SR policy packet may be as follows:

Candidate Path 1
  Metric information 4 of Candidate Path 1=20
  segment list 1
    Weight 1
    Metric information 1 of segment list 1=10
  segment list 2
    Weight 2
    Metric information 2 of segment list 2=20
  segment list 3
    Weight 3
    Metric information 3 of segment list 3=5

In this way, the control entity extends the BGP update message, so that the BGP update message carries the first metric information of the first SR path. This provides a data basis for the route selection node to subsequently perform route selection expected by the user from the plurality of paths including the first SR path.

S103: The control entity sends the first BGP update message to the first network device, where the first network device is the ingress node of the first SR path.

S104: The first network device obtains the first BGP update message generated by the control entity.

S105. The first network device performs route selection on the plurality of paths to the destination node based on the first metric information, where each of the plurality of paths has the same IP prefix of the destination node, and the plurality of paths include the first SR path.

It should be noted that before S105, the method 100 may further include a process in which the first network device obtains a plurality of routes that correspond to the IP prefix and that are to the destination node. The process of obtaining the routes may be performed simultaneously with S101 to S104; or the process of obtaining the routes may be first performed, and S101 to S104 are then performed; or S101 to S104 may be first performed, and the process of obtaining the routes is then performed.

The network shown in FIG. 1b is used as an example. A process in which the PE device 1 obtains a route to a CE device 2 may include: The CE device 2 advertises an IP prefix 10.1.1.1 in the network via a PE device 2 and a PE device 3, the PE device 1 receives a route 1 whose IP prefix is 10.1.1.1 and advertised by the PE device 2, and a next hop of the route 1 is the PE device 2. The PE device 1 further receives a route 2 whose IP prefix is 10.1.1.1 and advertised by the PE device 3, and a next hop of the route 2 is the PE device 3. In this way, the PE device 1 has a plurality of routes to the CE device 2. Before generating a forwarding entry, the PE device 1 may perform route selection on the routes to the CE device 2, and then generate the corresponding forwarding entry based on a route selection result.

To describe a route selection process of the first network device in S105 more clearly, descriptions are provided by using an example in which there are two paths to the destination node.

In some embodiments, the method 100 may further include the following operations. S106: The control entity determines second metric information of a second SR path, where the second metric information represents quality of the second SR path. S107: The control entity generates a second BGP update message, where the second BGP update message includes the second metric information, the second metric information is used for route selection on the plurality of paths, and the plurality of paths include the second SR path. S108: The control entity sends the second BGP update message to the first network device, where the first network device is an ingress node of the second SR path.

As an example, the plurality of paths participating in the route selection include two paths: the first SR path and the second SR path, and the ingress nodes of the first SR path and the second SR path are both the first network device. If the routes that correspond to the IP prefix of the destination node and that are received by the first network device includes: a first route and a second route. For example, S105 may be as follows: The first network device iterates, to the first SR path based on the next hop, the first route corresponding to the IP prefix of the destination node, so that the first route inherits the first metric information of the first SR path; and iterates, to the second SR path based on the next hop, the second route corresponding to the IP prefix of the destination node, so that the second route inherits the second metric information of the second SR path. Then, the first network device selects a route with better quality based on the first metric information of the first route and the second metric information of the second route. For example, if the quality represented by the first metric information is better than the quality represented by the second metric information, the route selection result in S105 is the first route. Therefore, the first network device can generate a first forwarding entry based on the first route, and the first forwarding entry guides encapsulation and forwarding of a packet whose destination address matches the IP prefix of the destination node. For another example, if the quality represented by the second metric information is better than the quality represented by the first metric information, the route selection result in S105 is the second route. Therefore, the first network device can generate a second forwarding entry based on the second route, and the second forwarding entry guides encapsulation and forwarding of a packet whose destination address matches the IP prefix of the destination node.

In one case, egress nodes of the first SR path and the second SR path are both second network devices. For example, refer to a network shown in FIG. 4a. A P device 1 is a route selection node and an ingress node of a plurality of SR paths, and corresponds to the first network device in the method 100, an SR path 1 is from the P device 1 to a PE device 2 through a P device 2 and a P device 3, an SR path 2 is from the P device 1 to the PE device 2 through a P device 4, a BGP update message 1 sent by a controller 50 to the P device 1 carries a segment list 1 and metric information 1 of the SR path 1, and a BGP update message 2 sent by the controller 50 to the P device 1 carries a segment list 2 and metric information 2 of the SR path 2. In this way, the P device 1 may iterate a route 1 and a route 2 to a same destination node (for example, the PE device 2 or another device connected to the PE device 2) to the SR path 1 and the SR path 2 respectively, so that the route 1 inherits the metric information 1 of the SR path 1, and the route 2 inherits the metric information 2 of the SR path 2. Therefore, the P device 1 can select a route with better quality from the route 1 and the route 2 based on the metric information 1 and the metric information 2. Assuming that the metric information is a TE metric, the metric information 1=20, and the metric information 2=100, a route selection result of the P device 1 is the route 1, so that a forwarding entry 1 is generated based on the route 1. In this way, when receiving a packet whose destination address matches an IP prefix of the destination node, the P device 1 encapsulates the packet based on the forwarding entry 1 and forwards the packet along the SR path 1.

In another case, an egress node of the first SR path is a second network device, and an egress node of the second SR path is a third network device. For example, refer to the network shown in FIG. 1*b*. A PE device 1 is a route selection node and an ingress node of a plurality of SR paths, and corresponds to the first network device in the method 100, an SR path 1 is from the PE device 1 to a PE device 2 through a P device 1 and a P device 2, an SR path 2 is from the PE device 1 to a PE device 3 through a P device 3 and a P device 4, a BGP update message 1 sent by a controller 50 to the PE device 1 carries a segment list 1 and metric information 1 of the SR path 1, and a BGP update message 2 sent by the controller 50 to the PE device 1 carries a segment list 2 and metric information 2 of the SR path 2. In this way, the PE device 1 may iterate a route 1 and a route 2 to a same destination node (for example, the CE device 2) to the SR path 1 and the SR path 2 respectively, so that the route 1 inherits the metric information 1 of the SR path 1, and the route 2 inherits the metric information 2 of the SR path 2. Therefore, the P device 1 can select a route with better quality from the route 1 and the route 2 based on the metric information 1 and the metric information 2.

As another example, the plurality of paths participating in the route selection include two paths: a first path and a second path. The first path includes the first SR path, and the second path includes the second SR path. For example, the first path may further include a first segment path in addition to the first SR path, and the second path may further include a second segment path in addition to the second SR path. The routes that correspond to the IP prefix of the destination node and that are received by the first network device include a first route and a second route. In this case, for example, S105 may be as follows: The first network device iterates, to the first path based on the next hop, the first route corresponding to the IP prefix of the destination node, so that third metric information of the first route includes the first metric information of the first SR path, and iterates, to the second SR path based on the next hop, the second route corresponding to the IP prefix of the destination node, so that fourth metric information of the second route includes the second metric information of the second SR path. Then, the first network device selects a route with better quality based on the third metric information of the first route and the fourth metric information of the second route. If the first path includes the first SR path and the first segment path, the third metric information is a sum of the first metric information and fifth metric information of the first segment path. If the first path includes only the first SR path, the third metric information is the same as the first metric information. If the second path includes the second SR path and the second segment path, the fourth metric information is a sum of the second metric information and sixth metric information of the second segment path. If the second path includes only the second SR path, the fourth metric information is the same as the second metric information.

Figure 4B:
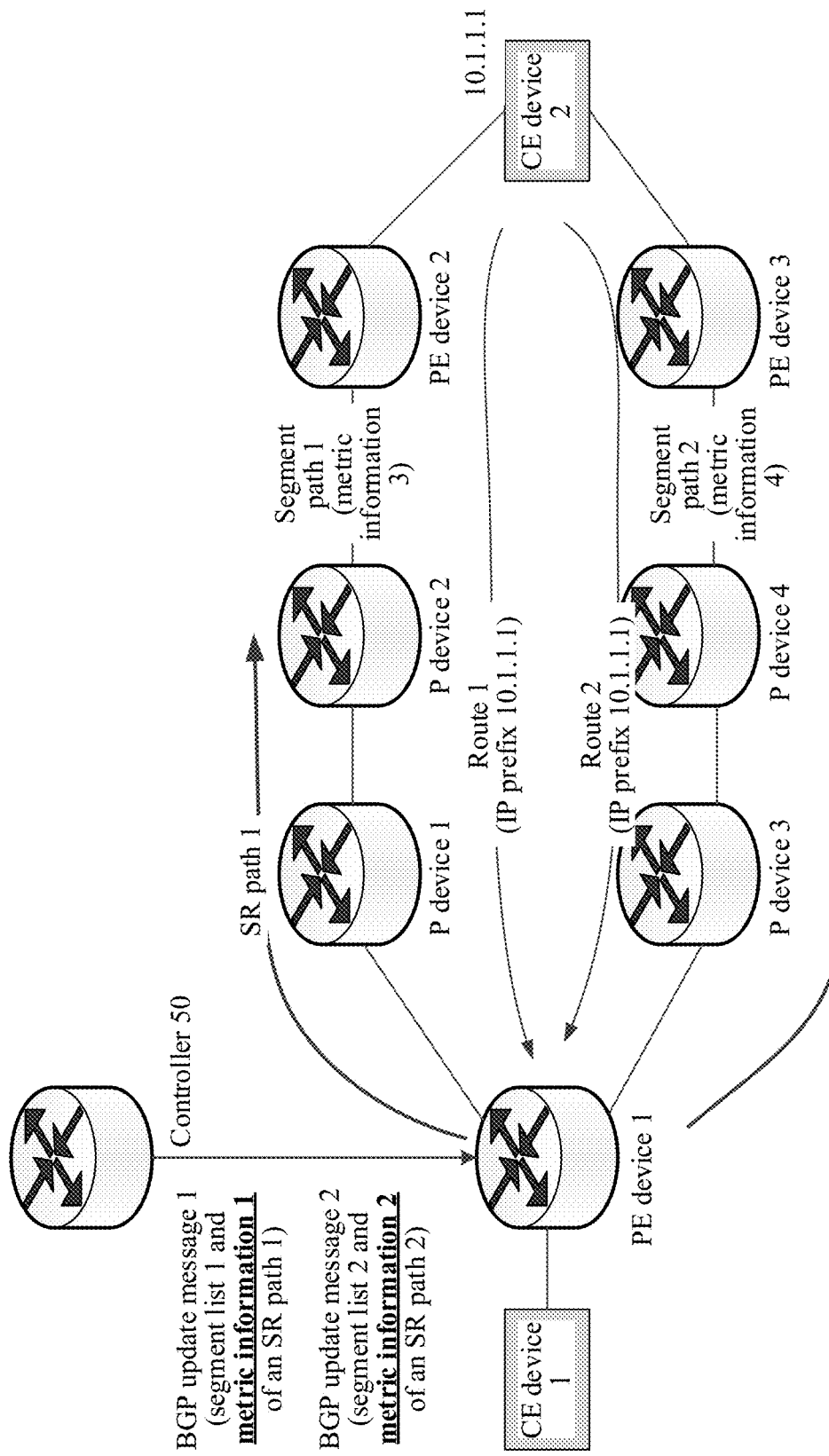
FIG. 4b is a schematic diagram of a structure of another network scenario according to this application.

In a case, the first path includes the first SR path and the first segment path, and the second path includes the second SR path and the second segment path. For example, refer to a network shown in FIG. 4*b*. A PE device 1 is a route selection node and an ingress node of a plurality of paths, and corresponds to the first network device in the method 100, an SR path 1 is from the PE device 1 to a P device 2 through a P device 1, an SR path 2 is from the PE device 1 to a P device 4 through a P device 3, a segment path 1 is from the P device 2 to a PE device 2, metric information of the segment path 1 is metric information 3, a segment path 2 is from the P device 4 to a PE device 3, metric information of the segment path 2 is metric information 4, a BGP update message 1 sent by a controller 50 to the PE device 1 carries a segment list 1 and metric information 1 of the SR path 1, and a BGP update message 2 sent by the controller 50 to the PE device 1 carries a segment list 2 and metric information 2 of the SR path 2. In this way, the PE device 1 may iterate a route 1 and a route 2 to a same destination node (for example, the CE device 2) to the SR path 1 and the SR path 2 respectively, so that metric information 5 of the route 1 may be a sum of the metric information 1 of the SR path 1 and the metric information 3 of the segment path 1, and metric information 6 of the route 2 may be a sum of the metric information 2 of the SR path 2 and the metric information 4 of the segment path 2. Therefore, the PE device 1 can select a route with better quality from the route 1 and the route 2 based on the metric information 5 and the metric information 6. Assuming that the metric information is a TE metric, the metric information 1=20, the metric information 2=100, the metric information 3=30, and the metric information 4=10, the metric information 5 corresponding to the route 1=(20+30)=50, the metric information 6 corresponding to the route 2=(100+10)=110, and a route selection result of the PE device 1 is the route 1, so that a forwarding entry 1 is generated based on the route 1. In this way, when receiving a packet whose destination address matches an IP prefix of the destination node, the P device 1 encapsulates the packet based on the forwarding entry 1, and forwards the packet along the SR path 1 and the segment path 1.

Figure 4C:
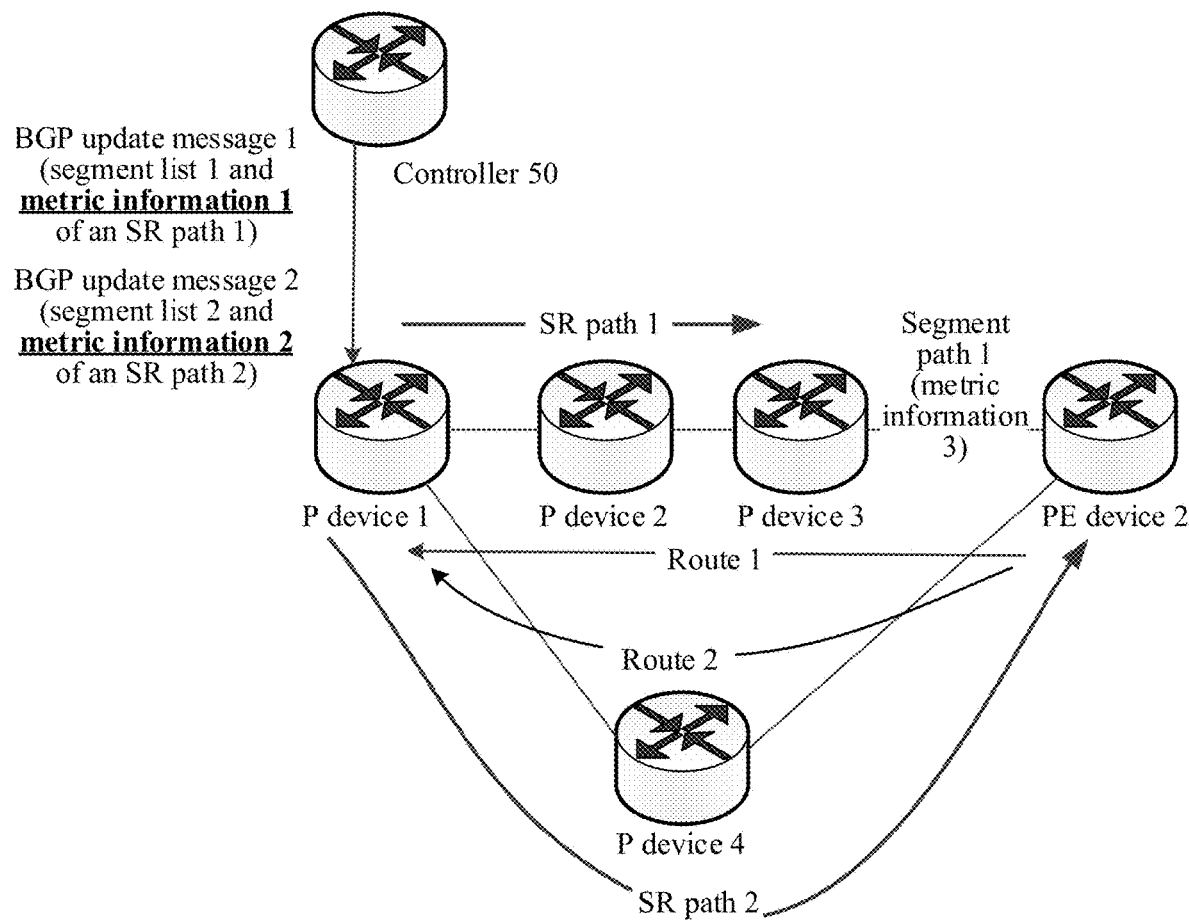
FIG. 4c is a schematic diagram of a structure of still another network scenario according to this application.

In another case, the first path includes the first SR path and the first segment path, and the second path includes only the second SR path. For example, refer to a network shown in FIG. 4*c*. A P device 1 is a route selection node and an ingress node of a plurality of paths, and corresponds to the first network device in the method 100, an SR path 1 is from a P device 1 to a P device 3 through a P device 2, an SR path 2 is from the P device 1 to the PE device 2 through a P device 4, a segment path 1 is from the P device 3 to the PE device 2, metric information of the segment path 1 is metric information 3, a BGP update message 1 sent by a controller 50 to the P device 1 carries a segment list 1 and metric information 1 of the SR path 1, and a BGP update message 2 sent by the controller 50 to the P device 1 carries a segment list 2 and metric information 2 of the SR path 2. In this way, the P device 1 may iterate a route 1 and a route 2 to a same destination node (for example, the PE device 2 or another device connected to the PE device 2) to the SR path 1 and the SR path 2 respectively, so that metric information 4 of the route 1 may be a sum of the metric information 1 of the SR path 1 and the metric information 3 of the segment path 1, and the route 2 inherits the metric information 2 of the SR path 2. Therefore, the P device 1 can select a route with better quality from the route 1 and the route 2 based on the metric information 4 and the metric information 2. Assuming that the metric information is a TE metric, the metric information 1=20, the metric information 2=100, and the metric information 3=30, metric information 4 corresponding to the route 1=(20+30)=50, the metric information 2 corresponding to the route 2=100, and a route selection result of the P device 1 is the route 1.

In this way, according to the method 100, the control entity can send, to the ingress node of the SR path by using the BGP update message, the metric information that represents the quality of the SR path. When the route selection node is the ingress node of the SR path, the route selection node can perform, based on the metric information of the SR path, proper route selection on the plurality of paths including the SR path, so that the route selection can meet an expectation of the user for the route selection, thereby overcoming a problem that route selection cannot be performed based on the expectation of the user because the metric information of the SR path is not considered in the current route selection.

Figure 5:
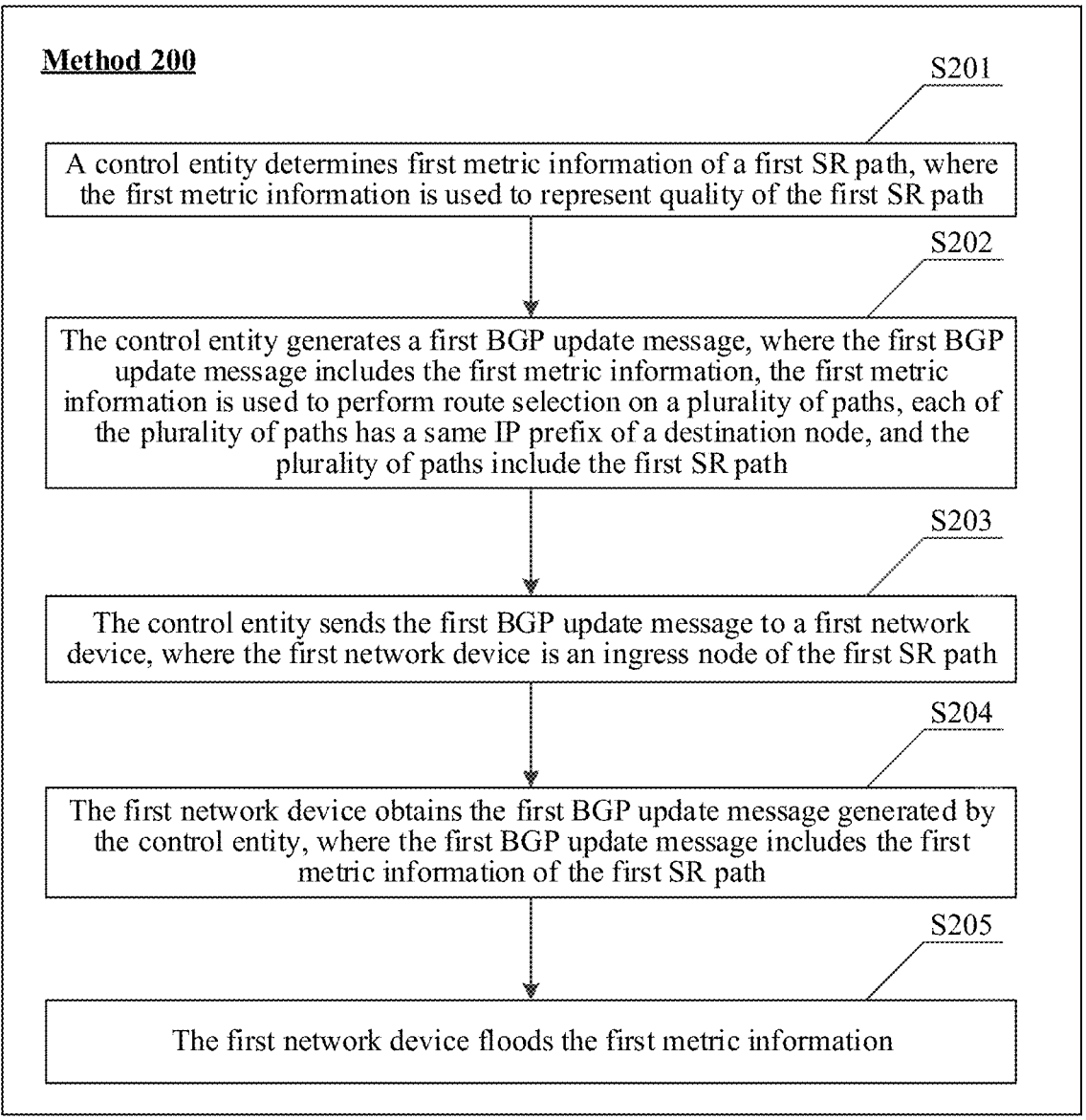
FIG. 5 is a schematic flowchart of another route selection method 200 according to this application.

FIG. 5 is a schematic flowchart of a route selection method 200 according to an embodiment of this application. To describe the method provided in embodiments of this application more clearly, the method 200 is described in a manner of interaction between a control entity and a first network device in a network. The first network device is an ingress node of a first SR path, but is not a route selection node in the network.

As shown in FIG. 5, the method 200 may include, for example, the following S201 to S205.

S201: The control entity determines first metric information of the first SR path, where the first metric information represents quality of the first SR path.

S202: The control entity generates a first BGP update message, where the first BGP update message includes the first metric information, the first metric information is used for route selection on a plurality of paths, each of the plurality of paths has a same IP prefix of a destination node, and the plurality of paths include the first SR path.

S203: The control entity sends the first BGP update message to the first network device, where the first network device is the ingress node of the first SR path.

S204: The first network device obtains the first BGP update message generated by the control entity, where the first BGP update message includes first metric information of the first SR path.

S205: The first network device floods the first metric information.

It should be noted that, for examples and achieved effects of S201 to S204, refer to the related descriptions of S101 to S104 in the method 100.

As an example, S205 may include: The first network device floods the first metric information in the network according to an IGP, so that a route selection node can sense quality of the first SR path, and the quality of the first SR path is used as a reference for the route selection node to perform route selection, thereby implementing the route selection that meets an expectation of a user.

After S205, the method 200 further includes a process in which the route selection node performs route selection. For ease of description, descriptions are provided by using an example in which two paths to a destination node are included.

In some embodiments, the method 200 may further include the following operations. S206: The control entity determines second metric information of a second SR path, where the second metric information represents quality of the second SR path. S207: The control entity generates a second BGP update message, where the second BGP update message includes the second metric information, the second metric information is used for route selection on the plurality of paths, and the plurality of paths include the second SR path. S208: The control entity sends the second BGP update message to the first network device, where the first network device is an ingress node of the second SR path.

As an example, the plurality of paths participating in the route selection include two paths: a first path and a second path. The first path includes a first segment path and the first SR path. The second path includes the first segment path and the second SR path. The first segment path is a path between a fourth network device and the first network device. The fourth network device is a route selection node. In this case, the method 200 further includes: The fourth network device performs route selection on the plurality of paths to the destination node based on the first metric information and the second metric information, or the fourth network device performs route selection on the plurality of paths to the destination node based on fourth metric information and fifth metric information, where the fourth metric information is a sum of the first metric information and third metric information of the first segment path, and the fifth metric information is a sum of the second metric information and third metric information of the first segment path.

Figure 6A:
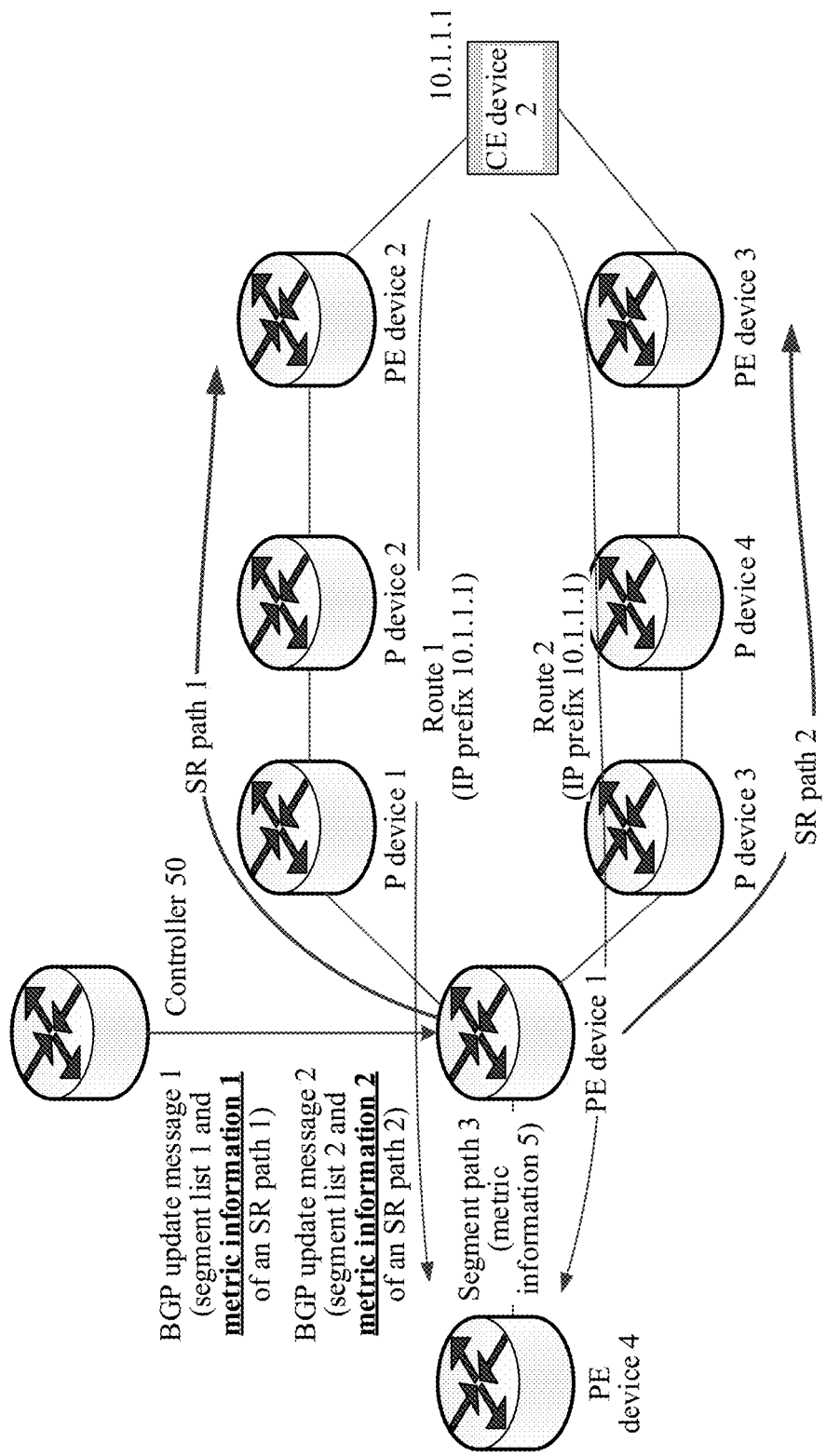
FIG. 6a is a schematic diagram of a structure of a network scenario according to this application.

In one case, egress nodes of the first SR path and the second SR path are a second network device and a third network device respectively. For example, refer to a network shown in FIG. 6*a*. A PE device 1 is an ingress node of a plurality of SR paths, and corresponds to the first network device in the method 200, a PE device 4 is a route selection node, and corresponds to the fourth network device in the method 200, an SR path 1 is from the PE device 1 to a PE device 2 through a P device 1 and a P device 2, an SR path 2 is from the PE device 1 to a PE device 3 through a P device 3 and a P device 4, a BGP update message 1 sent by a controller 50 to the PE device 1 carries a segment list 1 and metric information 1 of the SR path 1, and a BGP update message 2 sent by the controller 50 to the PE device 1 carries a segment list 2 and metric information 2 of the SR path 2. Then, the PE device 1 may flood the metric information 1 of the SR path 1 and the metric information 2 of the SR path 2, so that the route selection node, namely, the PE device 4 obtains the metric information 1 of the SR path 1 and the metric information 2 of the SR path 2. In this way, the PE device 4 may correspond a route 1 to a same destination node (for example, a CE device 2) to the SR path 1 and a segment path 3, and correspond a route 2 to the SR path 2 and the segment path 3. Therefore, the PE device 4 can select a route with better quality from the route 1 and the route 2 based on the metric information 1 and the metric information 2, or the PE device 4 can select a route with better quality from the route 1 and the route 2 based on metric information 4 and metric information 5, where the metric information 4 is a sum of the metric information 1 and metric information 3, and the metric information 5 is a sum of the metric information 2 and the metric information 3.

Figure 6B:
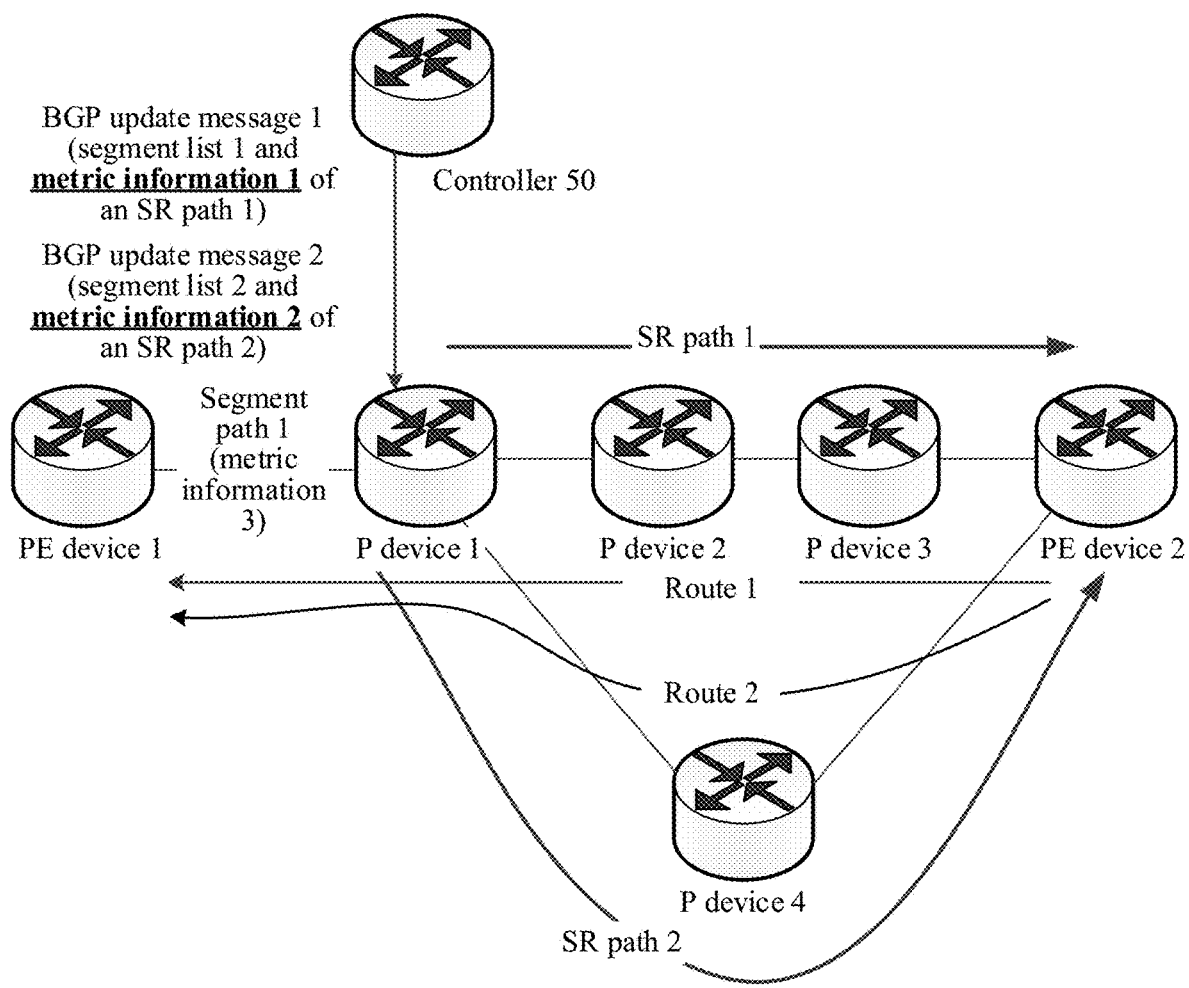
FIG. 6b is a schematic diagram of a structure of another network scenario according to this application.

In another case, egress nodes of the first SR path and the second SR path are both second network devices. For example, refer to a network shown in FIG. 6b. A P device 1 is an ingress node of a plurality of SR paths, and corresponds to the first network device in the method 200, a PE device 1 is a route selection node, and corresponds to the fourth network device in the method 200, an SR path 1 is from the P device 1 to a PE device 2 through a P device 2 and a P device 3, an SR path 2 is from the P device 1 to a PE device 2 through a P device 4, a BGP update message 1 sent by a controller 50 to the P device 1 carries a segment list 1 and metric information 1 of the SR path 1, and a BGP update message 2 sent by the controller 50 to the P device 1 carries a segment list 2 and metric information 2 of the SR path 2. Then, the P device 1 may flood the metric information 1 of the SR path 1 and the metric information 2 of the SR path 2, so that the route selection node, namely, the PE device 1 obtains the metric information 1 of the SR path 1 and the metric information 2 of the SR path 2. In this way, the PE device 1 may correspond a route 1 to a same destination node (for example, the PE device 2 or another device connected to the PE device 2) to the SR path 1 and a segment path 1, and correspond a route 2 to the SR path 2 and the segment path 1. Therefore, the PE device 1 can select a route with better quality from the route 1 and the route 2 based on the metric information 1 and the metric information 2, or the PE device 1 can select a route with better quality from the route 1 and the route 2 based on metric information 4 and metric information 5, where the metric information 4 is a sum of the metric information 1 and metric information 3, and the metric information 5 is a sum of the metric information 2 and the metric information 3.

As another example, the plurality of paths participating in the route selection include two paths: a first path and a second path. The first path includes a first segment path, a first SR path, and a second segment path. The second path includes the first segment path, the second SR path, and a third segment path. The first segment path is a path between the fourth network device and the first network device. The fourth network device is the route selection node. In this case, the method 200 further includes: The fourth network device performs route selection on the plurality of paths to the destination node based on the first metric information and the second metric information. For example, the fourth network device performs route selection on the plurality of paths to the destination node based on sixth metric information and seventh metric information, where the sixth metric information is a sum of the first metric information, the third metric information of the first segment path, and the fourth metric information of the second segment path, and the seventh metric information is a sum of the second metric information, the third metric information of the first segment path, and the fifth metric information of the third segment path.

Figure 6C:
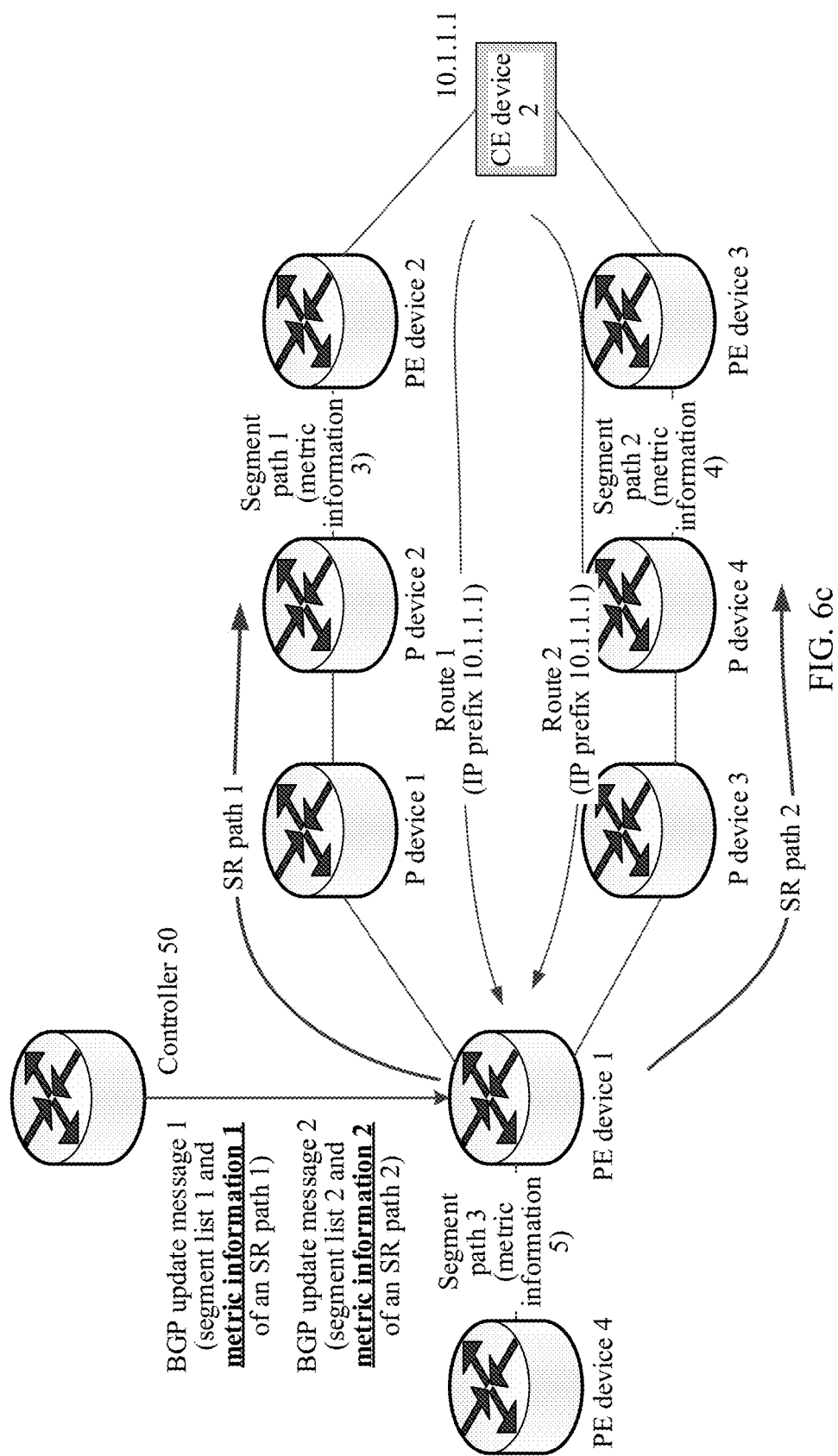
FIG. 6c is a schematic diagram of a structure of still another network scenario according to this application.

In a case, refer to a network shown in FIG. 6c. A PE device 1 is an ingress node of a plurality of SR paths, and corresponds to the first network device in the method 200, a PE device 4 is a route selection node, and corresponds to the fourth network device in the method 200, an SR path 1 is from the PE device 1 to a P device 2 through a P device 1, an SR path 2 is from the PE device 1 to a P device 4 through a P device 3, a segment path 1 is from the P device 2 to the PE device 2, a segment path 2 is from the P device 4 to a PE device 3, and a segment path 3 is from the PE device 4 to the PE device 1. In this case, a BGP update message 1 sent by a controller 50 to the PE device 1 carries a segment list 1 and metric information 1 of the SR path 1, and a BGP update message 2 sent by the controller 50 to the PE device 1 carries a segment list 2 and metric information 2 of the SR path 2. Then, the PE device 1 may flood the metric information 1 of the SR path 1 and the metric information 2 of the SR path 2, so that the route selection node, namely, the PE device 4 obtains the metric information 1 of the SR path 1 and the metric information 2 of the SR path 2. In this way, the PE device 4 may correspond a route 1 to a same destination node (for example, the CE device 2) to the SR path 1, the segment path 3, and the segment path 1, and correspond a route 2 to the SR path 2, the segment path 3, and the segment path 2. Therefore, the PE device 4 can select a route with better quality from the route 1 and the route 2 based on metric information 6 and metric information 7, where the metric information 6 is a sum of the metric information 1 and metric information 3, and the metric information 7 is a sum of the metric information 2 and metric information 4; or the metric information 6 is a sum of the metric information 1, metric information 5, and metric information 3, and the metric information 7 is a sum of the metric information 2, the metric information 5, and metric information 4.

Figure 6D:
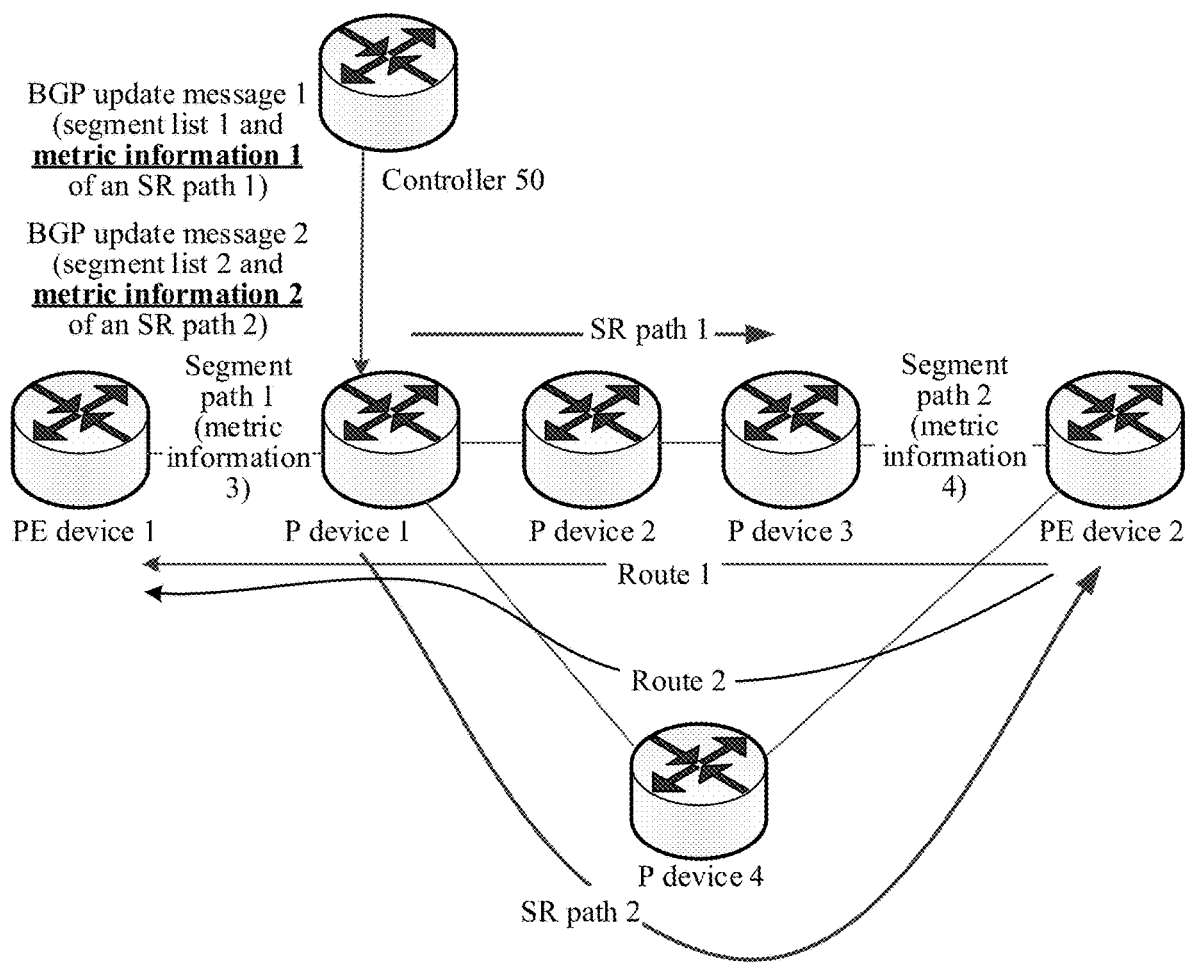
FIG. 6d is a schematic diagram of a structure of yet another network scenario according to this application.

In another case, for example, refer to a network shown in FIG. 6d. A P device 1 is an ingress node of a plurality of SR paths, and corresponds to the first network device in the method 200, a PE device 1 is a route selection node, and corresponds to the fourth network device in the method 200, an SR path 1 is from the P device 1 to a P device 3 through a P device 2, an SR path 2 is from the P device 1 to the PE device 2 through a P device 4, a segment path 1 is from the PE device 1 to the P device 1, and a segment path 2 is from the P device 3 to the PE device 2. In this case, a BGP update message 1 sent by a controller 50 to the P device 1 carries a segment list 1 and metric information 1 of the SR path 1, and a BGP update message 2 sent by the controller 50 to the P device 1 carries a segment list 2 and metric information 2 of the SR path 2. Then, the P device 1 may flood the metric information 1 of the SR path 1 and the metric information 2 of the SR path 2, so that the route selection node, namely, the PE device 1 obtains the metric information 1 of the SR path 1 and the metric information 2 of the SR path 2. In this way, the PE device 1 may correspond a route 1 to a same destination node (for example, the PE device 2 or another device connected to the PE device 2) to the SR path 1, the segment path 2, and the segment path 1, and correspond a route 2 to the SR path 2 and the segment path 1. Therefore, the PE device 1 can select a route with better quality from the route 1 and the route 2 based on metric information 5 and the metric information 2, where the metric information 5 is a sum of the metric information 1 and metric information 4 of the segment path 2; or the PE device 1 can select a route with better quality from the route 1 and the route 2 based on metric information 6 and metric information 7, where the metric information 6 is a sum of the metric information 1, the metric information 4, and metric information 3, and the metric information 7 is a sum of the metric information 2 and the metric information 3.

In this way, according to the method 200, the control entity can send, to the ingress node of the SR path by using the BGP update message, the metric information that represents the quality of the SR path. When the route selection node and the ingress node of the SR path are not a same network device, the ingress node of the SR path may flood the metric information of the SR path in the network. In this way, the route selection node can sense the metric information of the SR path, and perform, based on the metric information of the SR path, proper route selection on the plurality of paths including the SR path, so that the route selection can meet the expectation of the user for the route selection, thereby overcoming a problem that route selection cannot be performed based on the expectation of the user because the metric information of the SR path is not considered in the current route selection.

In some embodiments, if a network structure is complex, multi-layer route selection may be further included. In this case, the method provided in embodiments of this application may be used for route selection performed by each route selection node. To enrich the method provided in embodiments of this application, the method provided in embodiments of this application is described by using a network shown in FIG. 7 as an example.

Figure 7:
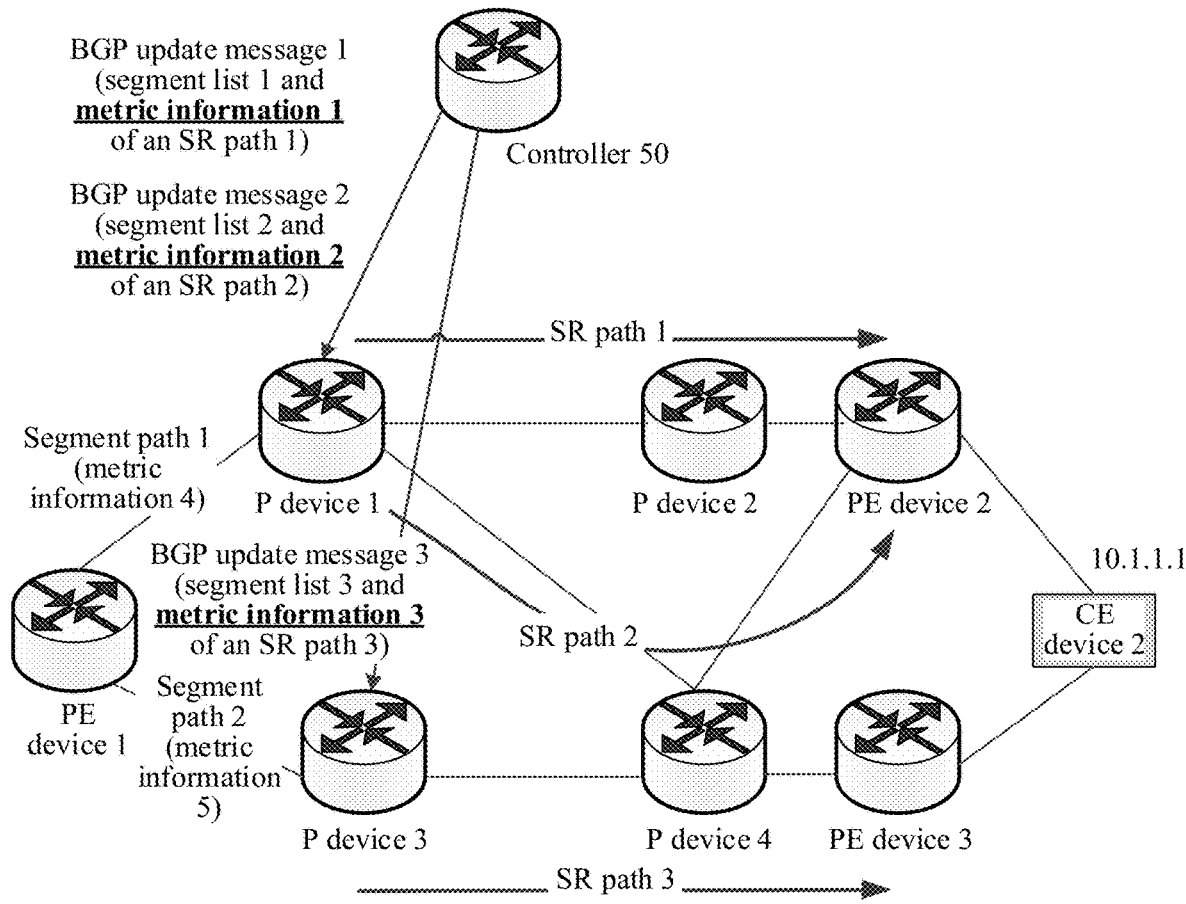
FIG. 7 is a schematic diagram of a structure of a network scenario according to this application.

Refer to FIG. 7. The network includes: a controller 50, a PE device 1, a PE device 2, a PE device 3, a P device 1, a P device 2, a P device 3, a P device 4, and a CE device 2. An SR path 1 is from the P device 1 to the PE device 2 through the P device 2, an SR path 2 is from a path from the P device 1 to the PE device 2 through the P device 4, an SR path 3 is from the P device 3 to the PE device 3 through the P device 4, a segment path 1 is from a path from the PE device 1 to the P device 1, a segment path 2 is from the PE device 1 to the P device 3, and metric information of the SR path 1, metric information of the SR path 2, metric information of the SR path 3, metric information of the segment path 1, and metric information of the segment path 2 are metric information 1, metric information 2, metric information 3, metric information 4, and metric information 5 respectively. The PE device 1 is a route selection node to the CE device 2 whose IP prefix is 10.1.1.1. For example, a route selection process may include the following operations.

S301: The PE device 2 advertises a route 1 to the CE device 2 to the PE device 1, where an IP prefix of the route 1 is 10.1.1.1, and a next hop is the PE device 2. For example, an extended community attribute of the route 1 may further include color 1.

S302: The PE device 3 advertises a route 2 to the CE device 2 to the PE device 1, where an IP prefix of the route 2 is 10.1.1.1, and a next hop is the PE device 3. For example, an extended community attribute of the route 2 may further include color 1.

S303: The controller 50 sends a BGP update message 1 and a BGP update message 2 to the P device 1, where the BGP update message 1 indicates an SR path 1 and metric information 1 of the SR path 1=100, and the BGP update message 2 indicates an SR path 2 and metric information 2 of the SR path 2=30.

S304: A route 1 of the P device 1 uses the SR path 2 as an outbound interface to the CE device 2, and metric information is a smaller value 30 in the metric information 1 and the metric information 2. That is, the P device 1 selects the route 1 to be iterated to the SR path 2.

S305: The controller 50 sends a BGP update message 3 to the P device 3, where the BGP update message 3 indicates an SR path 3 and metric information 3 of the SR path 3=20.

S306: A route 2 of the P device 3 uses the SR path 3 as an outbound interface to the CE device 2, and metric information is the metric information 3 of the SR path 3=20. That is, the P device 3 selects the route 2 to be iterated to the SR path 3.

S307: The P device 1 floods the metric information 2 of the SR path 2, and the P device 3 floods the metric information 3 of the SR path 3.

S308: A next hop of a route 1 whose IP prefix is 10.1.1.1 on the PE device 1 is the PE device 2, the route 1 corresponds to the segment path 1 and the SR path 2, and metric information 6 of the route 1=metric information 4 of the segment path 1+metric information 2=(10+30)=40. A next hop of a route 2 whose IP prefix is 10.1.1.1 on the PE device 1 is the PE device 3, the route 2 corresponds to the segment path 2 and the SR path 3, and metric information 7 of the route 2=metric information 5 of the segment path 2+metric information 3=(10+20)=30.

S309: When route selection is performed on a plurality of paths from the PE device 1 to the CE 1, select the next hop, namely, the PE device 3 with smaller metric information, and transmit a service packet through the segment path 2 and the SR path 3.

It can be learned that, in a complex network scenario, in the method provided in embodiments of this application, an expectation of a user for the route selection can still be met, and a problem that route selection cannot be performed based on the expectation of the user because the metric information of the SR path is not considered in the current route selection is overcome.

It should be noted that in the route selection method provided in embodiments of this application, another preset route selection policy, for example, a protocol preferred value in routes, a local route priority, preference of local routes, preference of a path with a small IGP metric, or preference of a route advertised by a router with a small router ID may alternatively be included. For example, the route selection policy may be configured on the route selection node based on an actual requirement. For example, if route selection needs to be performed based on the metric information provided in this embodiment of this application, a higher priority may be set for the metric information in the route selection. Alternatively, parameters in other route selection policies are set to be the same, so that route selection is performed based on the metric information in a real scenario.

It should be noted that examples of the network scenarios in embodiments of this application are merely some applicable scenarios proposed for ease of understanding, by readers, the technical solutions provided in embodiments of this application, and are not intended to limit the protection scope of this application. Embodiments of this application are further applicable to other route selection scenarios, which cannot be listed one by one in embodiments of this application.

It should be noted that, in the examples of the network scenarios in embodiments of this application, the P device may be a PE device, or may be a network device of another proper type. The PE device may alternatively be a P device, or may be a network device of another proper type. The network device of the proper type means that corresponding locations in the examples of the network scenarios can be deployed and the solutions provided in embodiments of this application can be implemented.

It should be noted that, in the examples of the network scenarios in embodiments of this application, all the nodes between the network devices are not shown. The network devices may be directly connected as shown in the accompanying drawings, or may be connected via several intermediate devices, provided that implementation of embodiments of this application is not affected.

Figure 8:
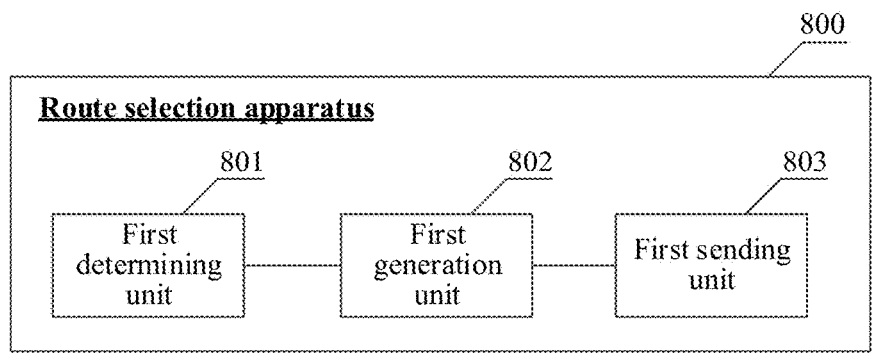
FIG. 8 is a schematic diagram of a structure of a route selection apparatus 800 according to this application.

Correspondingly, an embodiment of this application further provides a route selection apparatus 800. The apparatus 800 is used in a control entity, as shown in FIG. 8. The apparatus 800 may include: a first determining unit 801, a first generation unit 802, and a first sending unit 803.

The first determining unit 801 is configured to determine first metric information of a first segment routing SR path, where the first metric information represents quality of the first SR path. The first determining unit 801 may perform S101 shown in FIG. 2, or the first determining unit 801 may perform S201 shown in FIG. 5.

The first generation unit 802 is configured to generate a first border gateway protocol update BGP update message, where the first BGP update message includes the first metric information, the first metric information is used for route selection on a plurality of paths, each of the plurality of paths has a same internet protocol IP prefix of a destination node, and the plurality of paths include the first SR path. The first generation unit 802 may perform S102 shown in FIG. 2, or the first generation unit 802 may perform S202 shown in FIG. 5.

The first sending unit 803 is configured to send the first BGP update message to a first network device, where the first network device is an ingress node of the first SR path. The first sending unit 803 may perform S103 shown in FIG. 2, or the first sending unit 803 may perform S203 shown in FIG. 5.

In some embodiments, the apparatus 800 may further include: a second determining unit, a second generation unit, and a second sending unit. The second determining unit is configured to determine second metric information of a second SR path, where the second metric information represents quality of the second SR path. The second generation unit is configured to generate a second BGP update message, where the second BGP update message includes the second metric information, the second metric information is used for route selection on the plurality of paths, and the plurality of paths include the second SR path. The second sending unit is configured to send the second BGP update message to the first network device, where the first network device is an ingress node of the second SR path.

As an example, if an egress node of the first SR path is a second network device, and an egress node of the second SR path is a third network device, next hops of routes corresponding to the IP prefix include the second network device and the third network device, the plurality of paths include a first path and a second path, the first path includes the first SR path, and the second path includes the second SR path.

As another example, if an egress node of the first SR path and an egress node of the second SR path are both a second network device, a next hop of a route corresponding to the IP prefix includes the second network device, the plurality of paths include a first path and a second path, the first path includes the first SR path, and the second path includes the second SR path.

In one case, the first metric information is used by the first network device to perform route selection on the plurality of paths.

In another case, the first network device is connected to a fourth network device, and the first metric information is used by the fourth network device to perform route selection on the plurality of paths. In this case, if the first path further includes a first segment path from the fourth network device to the first network device, metric information of the first path includes the first metric information and third metric information of the first segment path.

In some embodiments, the apparatus 800 may further include: a third determining unit, a third generation unit, and a third sending unit. The third determining unit is configured to determine fourth metric information of a third SR path, where the fourth metric information represents quality of the third SR path. The third generation unit is configured to generate a third BGP update message, where the third BGP update message includes the fourth metric information, the fourth metric information is used for route selection on the plurality of paths, and the plurality of paths include the third SR path. The third sending unit is configured to send the third BGP update message to a fifth network device, where the fifth network device is an ingress node of the third SR path.

As an example, if an egress node of the first SR path is a second network device, and an egress node of the third SR path is a third network device, next hops of routes corresponding to the IP prefix include the second network device and the third network device, the plurality of paths include a first path and a third path, the first path includes the first SR path, and the third path includes the third SR path.

As another example, the first network device and the fifth network device are both connected to a fourth network device, and the first metric information is used by the fourth network device to perform route selection on the plurality of paths. If the first path further includes a first segment path from the fourth network device to the first network device, and the third path further includes a second segment path from the fourth network device to the fifth network device, fifth metric information of the first path includes the first metric information and sixth metric information of the first segment path, seventh metric information of the third path includes the fourth metric information and eighth metric information of the second segment path, and the fifth metric information and the seventh metric information are used by the fourth network device to perform route selection on the first path and the third path.

In some embodiments, if a type of the first SR path is a segment routing policy SR policy, the first BGP update message is a BGP SR policy packet. If the first SR path includes at least one candidate path, the first metric information includes metric information of a working path in the at least one candidate path.

As an example, the first metric information is carried in a candidate path sub-TLV field corresponding to the working path in the BGP SR policy packet. In this case, the first determining unit 801 may include: an obtaining subunit and a determining subunit. The obtaining subunit is configured to obtain metric information corresponding to at least one segment list segment list of a working path in the first SR path. The determining subunit is configured to determine the first metric information based on the metric information corresponding to the at least one segment list segment list. The first metric information is a maximum value in the metric information corresponding to the at least one segment list segment list.

As another example, the first SR path includes at least one candidate path, a working path in the at least one candidate path includes at least one segment list segment list, and the first metric information includes metric information corresponding to each of the at least one segment list. In this case, the first metric information is carried in a segment list sub-TLV field corresponding to each segment list in the BGP SR policy packet.

In some embodiments, if a type of the first SR path is an SR-TE tunnel, the BGP update message is a BGP SR-TE tunnel packet.

The first metric information includes at least one of the following information: an IGP metric, a TE metric, a bandwidth, a delay delay, or a loss rate.

It should be noted that for examples and achieved technical effects of the apparatus 800 provided in embodiments of this application, refer to the method 100 provided in FIG. 2 or the method 200 provided in FIG. 5.

Figure 9:
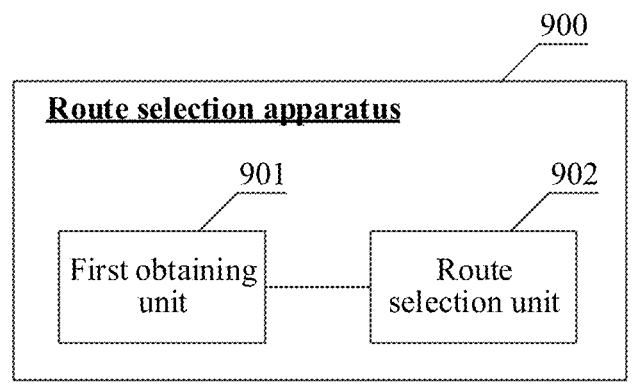
FIG. 9 is a schematic diagram of a structure of another route selection apparatus 900 according to this application.

Correspondingly, an embodiment of this application further provides a route selection apparatus 900. The apparatus 900 is used in a first network device, as shown in FIG. 9. The apparatus 900 may include: a first obtaining unit 901 and a route selection unit 902.

The first obtaining unit 901 is configured to obtain a first BGP update message generated by a control entity, where the first BGP update message includes first metric information of a first segment routing SR path, and the first metric information represents quality of the first SR path. The first obtaining unit 901 may perform S104 shown in FIG. 2.

The route selection unit 902 is configured to perform route selection on a plurality of paths to a destination node based on the first metric information, where each of the plurality of paths has a same internet protocol IP prefix of the destination node, and the plurality of paths include the first SR path. The route selection unit 902 may perform S105 shown in FIG. 2.

In some embodiments, the apparatus 900 may further include: a second obtaining unit. The second obtaining unit is configured to obtain a second BGP update message generated by the control entity, where the second BGP update message includes second metric information of a second SR path, and the second metric information represents quality of the second SR path. In this case, the route selection unit 902 is configured to: perform route selection on the plurality of paths to the destination node based on the first metric information and the second metric information, where the plurality of paths further include the second SR path.

As an example, the route selection unit 902 is configured to: associate, with the first SR path, a first route corresponding to the IP prefix, so that third metric information of the first route includes the first metric information; associate, with the second SR path, a second route corresponding to the IP prefix, so that fourth metric information of the second route includes the second metric information; and select the first route from the first route and the second route based on the third metric information and the fourth metric information, where a forwarding entry corresponding to the first route is used to guide packet forwarding from the first network device to the destination node, quality that is of a first path and that is represented by the third metric information is better than quality that is of a second path and that is represented by the fourth metric information, the plurality of paths include the first path and the second path, the first path includes the first SR path, and the second path includes the second SR path.

In some embodiments, if a type of the first SR path is an SR policy, the BGP update message is a BGP SR policy packet.

In some embodiments, if a type of the first SR path is an SR-TE tunnel, the BGP update message is a BGP SR-TE tunnel packet.

The first metric information includes at least one of the following information: an IGP metric, a TE metric, a bandwidth, a delay delay, or a loss rate.

It should be noted that for examples and achieved technical effects of the apparatus 900 provided in embodiments of this application, refer to the method 100 provided in FIG. 2.

Figure 10:
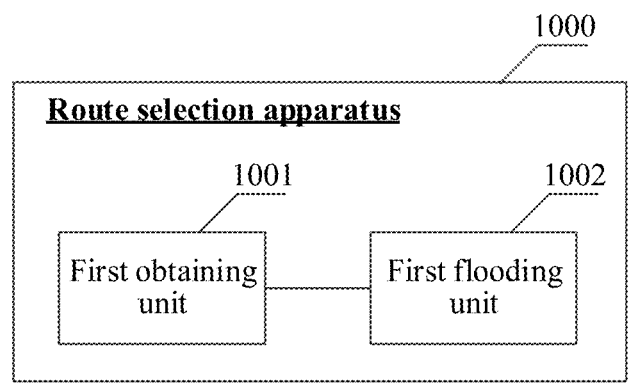
FIG. 10 is a schematic diagram of a structure of still another route selection apparatus 1000 according to this application.

Correspondingly, an embodiment of this application further provides a route selection apparatus 1000. The apparatus 1000 is used in a first network device, as shown in FIG. 10. The apparatus 1000 may include: a first obtaining unit 1001 and a first flooding unit 1002.

The first obtaining unit 1001 is configured to obtain a first border gateway protocol update BGP update message generated by a control entity, where the first BGP update message includes first metric information of a first segment routing SR path, the first metric information represents quality of the first SR path, the first metric information is used for route selection on a plurality of paths to a destination node, each of the plurality of paths has a same internet protocol IP prefix of the destination node, and the plurality of paths include the first SR path. The first obtaining unit 1001 may perform S204 shown in FIG. 5.

The first flooding unit 1002 is configured to flood the first metric information. The first flooding unit 1002 may perform S205 shown in FIG. 5.

As an example, the first flooding unit 1002 is configured to flood the first metric information according to an IGP.

As an example, the first metric information is used by a second network device to perform route selection on the plurality of paths to the destination node, and the second network device is connected to the first network device.

In some embodiments, the plurality of paths further include a second SR path, an ingress node of the second SR path is the first network device, and the apparatus 1000 may further include: a second obtaining unit and a second flooding unit. The second obtaining unit is configured to obtain a second BGP update message generated by the control entity, where the second BGP update message includes second metric information of the second SR path, the second metric information represents quality of the second SR path, and the second metric information is used for route selection on the plurality of paths to the destination node. The second flooding unit is configured to flood the second metric information.

In some embodiments, if a type of the first SR path is an SR policy, the BGP update message is a BGP SR policy packet.

In some embodiments, if a type of the first SR path is an SR-TE tunnel, the BGP update message is a BGP SR-TE tunnel packet.

The first metric information includes at least one of the following information: an IGP metric, a TE metric, a bandwidth, a delay delay, or a loss rate.

It should be noted that for examples and achieved technical effects of the apparatus 1000 provided in embodiments of this application, refer to the method 200 provided in FIG. 5.

Figure 11:
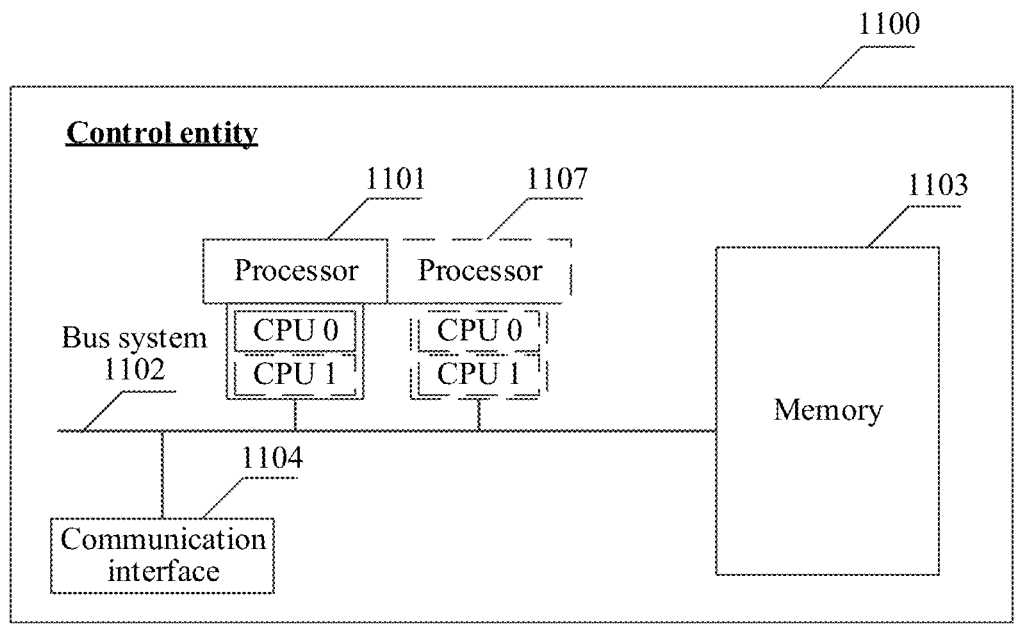
FIG. 11 is a schematic diagram of a structure of a control entity 1100 according to this application.

Refer to FIG. 11. An embodiment of this application provides a control entity 1100. The control entity 1100 may be the control entity or the controller in any one of the foregoing embodiments, for example, may be the controller 50 in FIG. 1a, FIG. 1b, FIG. 4a, FIG. 4b, FIG. 4c, FIG. 6a, FIG. 6b, FIG. 6c, FIG. 6d, or FIG. 7; or for another example, may be the control entity in the method 100 or the method 200. The control entity 1100 may implement functions of various control entities or controllers in the foregoing embodiments. The control entity 1100 includes: at least one processor 1101, a bus system 1102, a memory 1103, and at least one communication interface 1104.

The control entity 1100 is an apparatus of a hardware structure, and may be configured to implement functional modules in the route selection apparatus 800 shown in FIG. 8. For example, a person skilled in the art may figure out that the first determining unit 801, the first generation unit 802, and the first sending unit 803 in the route selection apparatus 800 shown in FIG. 8 may be implemented by the at least one processor 1101 by invoking code in the memory 1103.

For example, the control entity 1100 may be further configured to implement functions of the control entity in any one of the foregoing embodiments.

For example, the processor 1101 may be a general-purpose central processing unit (CPU), a network processor (NP), a microprocessor, an application-specific integrated circuit (ASIC), or one or more integrated circuits configured to control program execution of the solutions of this application.

The bus system 1102 may include a path for transmitting information between the foregoing components.

The communication interface 1104 is configured to communicate with another device or a communication network. The memory 1103 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor through the bus. The memory may alternatively be integrated with the processor.

The memory 1103 is configured to store application program code used for executing the solutions of this application, and the processor 1101 controls the execution. The processor 1101 is configured to execute the application program code stored in the memory 1103, to implement functions in the method in this application.

In some embodiments, the processor 1101 may include one or more CPUs, for example, a CPU 0 and a CPU 1 in FIG. 11.

In some embodiments, the control entity 1100 may include a plurality of processors, for example, the processor 1101 and a processor 1107 in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

Figure 12:
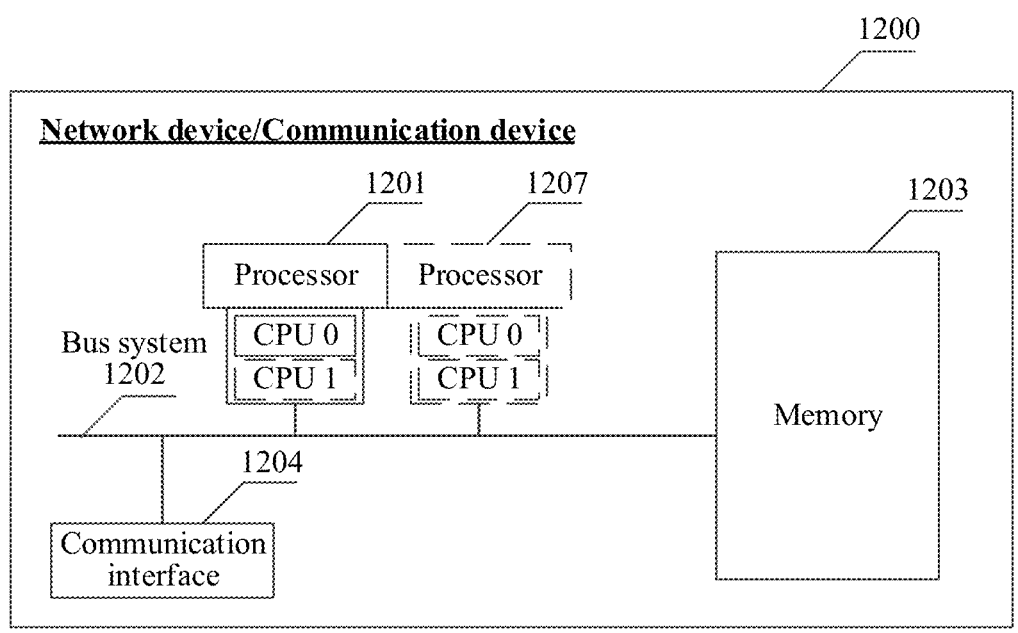
FIG. 12 is a schematic diagram of a structure of a network device 1200 according to this application.

Refer to FIG. 12. An embodiment of this application provides a network device 1200 (which may also be referred to as a communication device 1200). The network device 1200 may be the network device in any one of the foregoing embodiments, for example, may be the node having the route selection function or the ingress node of the SR path in FIG. 1a, FIG. 1b, FIG. 4a, FIG. 4b, FIG. 4c, FIG. 6a, FIG. 6b, FIG. 6c, FIG. 6d, or FIG. 7; or for another example, may be the first network device in the method 100 or the method 200. The network device 1200 may implement functions of various network devices in the foregoing embodiments. The network device 1200 includes: at least one processor 1201, a bus system 1202, a memory 1203, and at least one communication interface 1204.

The network device 1200 is an apparatus of a hardware structure, and may be configured to implement functional modules in the route selection apparatus 900 shown in FIG. 9. For example, a person skilled in the art may figure out that the first obtaining unit 901 and the route selection unit 902 in the route selection apparatus 900 shown in FIG. 9 may be implemented by the at least one processor 1201 by invoking code in the memory 1203. Alternatively, the network device 1200 is an apparatus of a hardware structure, and may be configured to implement functional modules in the route selection apparatus 1000 shown in FIG. 10. For example, a person skilled in the art may figure out that the first obtaining unit 1001 and the first flooding unit 1002 in the route selection apparatus 1000 shown in FIG. 10 may be implemented by the at least one processor 1201 by invoking code in the memory 1203.

For example, the network device 1200 may be further configured to implement functions of the network device in any one of the foregoing embodiments.

For example, the processor 1201 may be a general-purpose central processing unit (CPU), a network processor (NP), a microprocessor, an application-specific integrated circuit (ASIC), or one or more integrated circuits configured to control program execution of the solutions of this application.

The bus system 1202 may include a path for transmitting information between the foregoing components.

The communication interface 1204 is configured to communicate with another device or a communication network.

The memory 1203 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor through the bus. The memory may alternatively be integrated with the processor.

The memory 1203 is configured to store application program code used for executing the solutions of this application, and the processor 1201 controls the execution. The processor 1201 is configured to execute the application program code stored in the memory 1203, to implement functions in the method in this application.

In some embodiments, the processor 1201 may include one or more CPUs, for example, a CPU 0 and a CPU 1 in FIG. 12.

In some embodiments, the network device 1200 may include a plurality of processors, for example, the processor 1201 and a processor 1207 in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

Figure 13:
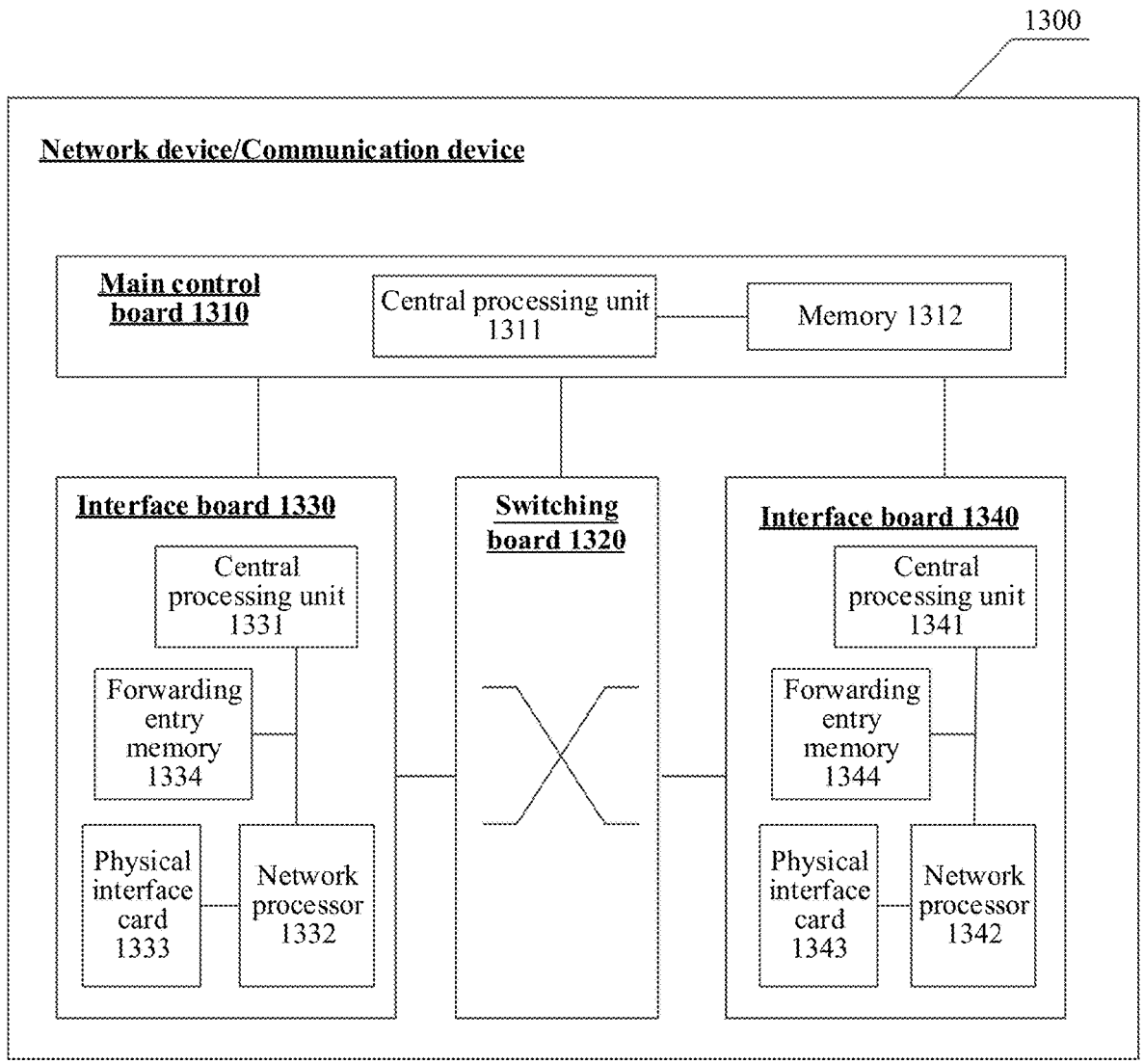
FIG. 13 is a schematic diagram of a structure of another network device 1300 according to this application.

FIG. 13 is a schematic diagram of a structure of another network device 1300 (which may also be referred to as a communication device 1300) according to an embodiment of this application. The network device 1300 may be the first network device or the control entity in any one of the foregoing embodiments, or may be the controller 50 in FIG. 1a, FIG. 1b, FIG. 4a, FIG. 4b, FIG. 4c, FIG. 6a, FIG. 6b, FIG. 6c, FIG. 6d, or FIG. 7; or for another example, may be the control entity in the method 100 or the method 200. For another example, the network device 1300 may be the node having the route selection function or the ingress node of the SR path in FIG. 1a, FIG. 1b, FIG. 4a, FIG. 4b, FIG. 4c, FIG. 6a, FIG. 6b, FIG. 6c, FIG. 6d, or FIG. 7; or for another example, may be the first network device in the method 100 or the method 200. The network device 1300 may implement functions of various network devices in the foregoing embodiments.

The network device 1300 includes: a main control board 1310 and an interface board 1330.

The main control board 1310 is also referred to as a main processing unit (MPU) or a route processor card. The main control board 1310 controls and manages components in the network device 1300, including functions such as route computation, device management, device maintenance, and protocol processing. The main control board 1310 includes: a central processing unit 1311 and a memory 1312.

The interface board 1330 is also referred to as a line processing unit (LPU), a line card (line card), or a service board. The interface board 1330 is configured to provide various service interfaces, and forward a data packet. The service interface includes, but is not limited to, an Ethernet interface, a POS (Packet over SONET/SDH) interface, and the like. The Ethernet interface is, for example, a flexible Ethernet service interface (Flexible Ethernet Clients, or FlexE Clients). The interface board 1330 includes: a central processing unit 1331, a network processor 1332, a forwarding entry memory 1334, and a physical interface card (PIC) 1333.

The central processing unit 1331 on the interface board 1330 is configured to: control and manage the interface board 1330, and communicate with the central processing unit 1311 on the main control board 1310.

The network processor 1332 is configured to forward a packet. A form of the network processor 1332 may be a forwarding chip. For example, processing on an uplink packet includes processing at a packet ingress interface and forwarding table lookup; and processing on a downlink packet includes forwarding table lookup and the like.

The physical interface card 1333 is configured to implement a physical layer interconnection function. Original traffic enters the interface board 1330 from the physical interface card, and a processed packet is sent from the physical interface card 1333. The physical interface card 1333 includes at least one physical interface, and the physical interface is also referred to as a physical port. The physical interface card 1333 corresponds to a FlexE physical interface in a system architecture. The physical interface card 1333, also referred to as a subcard, may be installed on the interface board 1330, and is responsible for converting an optical/electrical signal into a packet, performing validity check on the packet, and then forwarding the packet to the network processor 1332 for processing. In some embodiments, the central processing unit 1331 on the interface board 1330 may also perform a function of the network processor 1332, for example, implementing software forwarding based on a general-purpose CPU, so that the network processor 1332 is not needed in the physical interface card 1333.

For example, the network device 1300 includes a plurality of interface boards. For example, the network device 1300 further includes an interface board 1340. The interface board 1340 includes: a central processing unit 1341, a network processor 1342, a forwarding entry memory 1344, and a physical interface card 1343.

For example, the network device 1300 further includes a switching board 1320. The switching board 1320 may also be referred to as a switch fabric unit (SFU). When the network device has a plurality of interface boards 1330, the switching board 1320 is configured to complete data exchange between the interface boards. For example, the interface board 1330 and the interface board 1340 may communicate with each other via the switching board 1320.

The main control board 1310 is coupled to the interface board 1330. For example, the main control board 1310, the interface board 1330, the interface board 1340, and the switching board 1320 are connected to a system backboard via a system bus for interworking. In an embodiment, an inter-process communication (IPC) protocol channel is established between the main control board 1310 and the interface board 1330, and the main control board 1310 and the interface board 1330 communicate with each other through the IPC channel.

Logically, the network device 1300 includes: a control plane and a forwarding plane. The control plane includes the main control board 1310 and the central processing unit 1331. The forwarding plane includes components that perform forwarding, for example, the forwarding entry memory 1334, the physical interface card 1333, and the network processor 1332. The control plane performs functions such as a function of a router, generating a forwarding table, processing signaling and a protocol packet, and configuring and maintaining a device status. The control plane delivers the generated forwarding table to the forwarding plane. On the forwarding plane, the network processor 1332 searches the forwarding table delivered by the control plane to forward a packet received by the physical interface card 1333. The forwarding table delivered by the control plane may be stored in the forwarding entry memory 1334. In some embodiments, the control plane and the forwarding plane may be completely separated, and are not on a same device.

If the network device 1300 is configured as a control entity, the central processing unit 1311 may determine first metric information of a first SR path, and generate a first BGP update message. The network processor 1332 may trigger the physical interface card 1333 to send the first BGP update message to the first network device.

It should be understood that the first sending unit 803 in the route selection apparatus 800 and the communication interface 1104 in the control entity 1100 may be equivalent to the physical interface card 1333 or the physical interface card 1343 in the network device 1300. The first determining unit 801 and the first generation unit 802 in the route selection apparatus 800 and the processor 1101 in the control entity 1100 may be equivalent to the central processing unit 1311 or the central processing unit 1331 in the network device 1300.

It should be understood that an operation on the interface board 1340 is consistent with an operation on the interface board 1330 in this embodiment of this application. For brevity, details are not described again. It should be understood that the network device 1300 in this embodiment may correspond to the route selection apparatus 800 or the control entity 1100 in the foregoing method embodiment. The main control board 1310, the interface board 1330, and/or the interface board 1340 in the network device 1300 may implement functions and/or various implemented operations in the route selection apparatus 800 or the control entity 1100 in the foregoing method embodiment. For brevity, details are not described herein again.

If the network device 1300 is configured as a first network device, the network processor 1332 may trigger the physical interface card 1333 to obtain a first BGP update message generated by the control entity, where the first BGP update message includes first metric information of a first SR path. The central processing unit 1311 may perform route selection on the plurality of paths to the destination node based on the first metric information.

It should be understood that the first obtaining unit 901 in the route selection apparatus 900, the first obtaining unit 1001 in the route selection apparatus 1000, and the communication interface 1204 in the network device 1200 may be equivalent to the physical interface card 1333 or the physical interface card 1343 in the network device 1300. The route selection unit 902 in the route selection apparatus 900, the first flooding unit 1002 in the route selection apparatus 1000, and the processor 1201 in the network device 1200 may be equivalent to the central processing unit 1311 or the central processing unit 1331 in the network device 1300.

It should be understood that an operation on the interface board 1340 is consistent with an operation on the interface board 1330 in this embodiment of this application. For brevity, details are not described again. It should be understood that the network device 1300 in this embodiment may correspond to the route selection apparatus 800 or the control entity 1100 in the foregoing method embodiment. The main control board 1310, the interface board 1330, and/or the interface board 1340 in the network device 1300 may implement functions and/or various implemented operations in the route selection apparatus 900, the route selection apparatus 1000, or the network device 1200 in the foregoing method embodiment. For brevity, details are not described herein again.

It can be understood that, there may be one or more main control boards. When there are a plurality of main control boards, the main control boards may include an active main control board and a standby main control board. There may be one or more interface boards, and the network device with a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board implements a service data processing function in an entire system. In a distributed forwarding architecture, the network device may have at least one switching board, and exchange data between a plurality of interface boards via the switching board, to provide a large-capacity data exchange and processing capability. Therefore, a data access and processing capability of the network device in the distributed architecture is better than that of the device in the centralized architecture. For example, the network device may alternatively in a form in which there is only one card. In other words, there is no switching board, and functions of the interface board and the main control board are integrated on the card. In this case, the central processing unit on the interface board and the central processing unit on the main control board may be combined into one central processing unit on the card, to perform functions obtained by combining the two central processing units. The device in this form (for example, a network device such as a low-end switch or a router) has a weak data exchange and processing capability. An architecture that is to be used depends on a networking deployment scenario.

In some embodiments, the foregoing network devices or communication device may be implemented as virtualized devices. For example, the virtualized device may be a virtual machine (VM) on which a program having a packet sending function runs, and the virtual machine is deployed on a hardware device (for example, a physical server). The virtual machine is a complete software-simulated computer system that has complete hardware system functions and that runs in an entirely isolated environment. The virtual machine may be configured as each network device in FIG. 1*a* or FIG. 1*b*. For example, the network devices or communication device may be implemented based on a general-purpose physical server in combination with a network functions virtualization (NFV) technology. The network devices or communication device are virtual hosts, virtual routers, or virtual switches. After reading this application, based on the NFV technology, a person skilled in the art may virtualize, on the general-purpose physical server, the network devices or communication device having the foregoing functions. Details are not described herein again.

It should be understood that the network devices in the foregoing product forms separately have any function of the network device or the communication device in the foregoing method embodiments. Details are not described herein again.

An embodiment of this application further provides a chip, including: a processor and an interface circuit. The interface circuit is configured to: receive instructions and transmit the instructions to the processor. The processor may be, for example, a specific implementation form of the route selection apparatus in this embodiment of this application, and may be configured to perform the foregoing route selection method. The processor is coupled to a memory. The memory is configured to store a program or instructions. When the program or the instructions are executed by the processor, the chip system is enabled to implement the method in any one of the foregoing method embodiments.

For example, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

For example, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not limited in this application.

For example, the chip system may be a field programmable gate array (FPGA), an application-specific integrated circuit (ASIC), a system on chip (SoC), a CPU, a network processor (NP), a digital signal processing circuit (DSP), a microcontroller unit (MCU), a programmable logic device (PLD), or another integrated chip.

Figure 14:
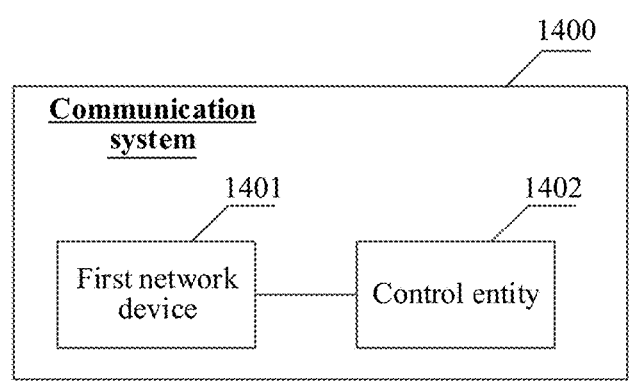
FIG. 14 is a schematic diagram of a structure of a communication system 1400 according to this application.

In addition, an embodiment of this application further provides a communication system 1400. Refer to FIG. 14. The communication system 1400 may include: a first network device 1401 and a control entity 1402. The first network device 1401 is configured to perform a corresponding operation performed by the first network device in any one of the foregoing embodiments of the method 100 or the method 200. The control entity 1402 is configured to perform a corresponding operation performed by the control entity in any one of the foregoing embodiments of the method 100 or the method 200.

In addition, an embodiment of this application further provides a computer-readable storage medium. The computer-readable storage medium stores program code or instructions. When the program code or the instructions are run on a computer, the computer is enabled to perform the method in any one of the implementations in the foregoing embodiment shown in FIG. 2 or FIG. 5.

In addition, an embodiment of this application further provides a computer program product. When the computer program product runs on a computer, the computer is enabled to perform the method in any one of the implementations in the method 100 or the method 200.

It should be understood that "determining B based on A" mentioned in embodiments of this application does not mean that B is determined based on only A, and B may alternatively be determined based on A and/or other information.

"First" in a name such as "first metric information" mentioned in this application is merely used as a name identifier, and does not represent the first in a sequence. This rule is also applicable to "second" and the like.

From the foregoing descriptions of the implementations, a person skilled in the art may clearly understand that some or all operations of the methods in the embodiments may be implemented by software in addition to a universal hardware platform. Based on such an understanding, the technical solutions of this application may be implemented in a form of a software product. The computer software product may be stored in a storage medium, for example, a read-only memory (ROM)/RAM, a magnetic disk, or an optical disc, and includes several instructions for instructing a computer device (which may be a personal computer, a server, or a network communication device such as a router) to perform the methods described in embodiments or some parts of embodiments of this application.

Embodiments in this specification are all described in a progressive manner, for same or similar parts in the embodiments, refer to these embodiments, and each embodiment focuses on a difference from other embodiments. Especially, system and device embodiments are basically similar to the method embodiments, and therefore are described briefly. For related parts, refer to partial descriptions in the method embodiments. The described device and system embodiments are merely examples. The modules described as separate components may or may not be physically separate, and components displayed as modules may or may not be physical modules, may be located in one position, or may be distributed on a plurality of network units. Some or all of the modules may be selected based on an actual requirement to achieve the objectives of the solutions of the embodiments. A person of ordinary skill in the art may understand and implement embodiments of this application without creative efforts.

The foregoing descriptions are examples of this application, but are not intended to limit the protection scope of this application. It should be noted that a person of ordinary skill in the art may make some improvements and polishing without departing from this application and the improvements and polishing shall fall within the protection scope of this application.

The invention claimed is:

1. A method of route selection, the method comprising:
   determining, by a control entity, first metric information of a first segment routing (SR) path, wherein the first metric information represents quality of the first SR path;
   generating, by the control entity, a first border gateway protocol (BGP) update message, wherein the first BGP update message comprises the first metric information, the first metric information is used for route selection on a plurality of paths, each of the plurality of paths has a same internet protocol (IP) prefix of a destination node, and the plurality of paths comprise the first SR path;
   sending, by the control entity, the first BGP update message to a first network device, wherein the first network device is an ingress node of the first SR path;
   determining, by the control entity, second metric information of a second SR path, wherein the second metric information represents quality of the second SR path;
   generating, by the control entity, a second BGP update message, wherein the second BGP update message comprises the second metric information, the second metric information is used for route selection on the plurality of paths, and the plurality of paths comprise the second SR path; and
   sending, by the control entity, the second BGP update message to the first network device, wherein the first network device is an ingress node of the second SR path.

2. The method according to claim 1, wherein if an egress node of the first SR path is a second network device, and an egress node of the second SR path is a third network device, next hops of routes corresponding to the IP prefix comprise the second network device and the third network device, the plurality of paths comprise a first path and a second path, the first path comprises the first SR path, and the second path comprises the second SR path.

3. The method according to claim 2, wherein the first network device is connected to a fourth network device, and the first metric information is used by the fourth network device to perform route selection on the plurality of paths.

4. The method according to claim 3, wherein if the first path further comprises a first segment path from the fourth network device to the first network device, metric information of the first path comprises the first metric information and third metric information of the first segment path.

5. The method according to claim 1, wherein if an egress node of the first SR path and an egress node of the second SR path are both a second network device, a next hop of a route corresponding to the IP prefix comprises the second network device, the plurality of paths comprise a first path and a second path, the first path comprises the first SR path, and the second path comprises the second SR path.

6. The method according to claim 1, wherein the first metric information is used by the first network device to perform route selection on the plurality of paths.

7. The method according to claim 1, further comprising:
   determining, by the control entity, fourth metric information of a third SR path, wherein the fourth metric information represents quality of the third SR path;
   generating, by the control entity, a third BGP update message, wherein the third BGP update message comprises the fourth metric information, the fourth metric information is used for route selection on the plurality of paths, and the plurality of paths comprise the third SR path; and
   sending, by the control entity, the third BGP update message to a fifth network device, wherein the fifth network device is an ingress node of the third SR path.

8. The method according to claim 7, wherein if an egress node of the first SR path is a second network device, and an egress node of the third SR path is a third network device, next hops of routes corresponding to the IP prefix comprise the second network device and the third network device, the plurality of paths comprise a first path and a third path, the first path comprises the first SR path, and the third path comprises the third SR path.

9. The method according to claim 8, wherein the first network device and the fifth network device are both connected to a fourth network device, and the first metric information is used by the fourth network device to perform route selection on the plurality of paths.

10. The method according to claim 9, wherein if the first path further comprises a first segment path from the fourth network device to the first network device, and the third path further comprises a second segment path from the fourth network device to the fifth network device, fifth metric information of the first path comprises the first metric information and sixth metric information of the first segment path, seventh metric information of the third path comprises the fourth metric information and eighth metric information of the second segment path, and the fifth metric information and the seventh metric information are used by the fourth network device to perform route selection on the first path and the third path.

11. The method according to claim 1, wherein if a type of the first SR path is a segment routing policy (SR policy), the first BGP update message is a BGP SR policy packet.

12. The method according to claim 11, wherein if the first SR path comprises at least one candidate path, the first metric information comprises metric information of a working path in the at least one candidate path.

13. The method according to claim 12, wherein the first metric information is carried in a candidate path sub-type-length-value (sub-TLV) field corresponding to the working path in the BGP SR policy packet.

14. The method according to claim 11, wherein the determining, by a control entity, first metric information of a first segment routing (SR) path comprises: obtaining, by the control entity, metric information corresponding to at least one segment list of a working path in the first SR path; and determining, by the control entity, the first metric information based on the metric information corresponding to the at least one segment list.

15. A method of route selection, the method comprising:
obtaining, by a first network device, a first border gateway protocol (BGP) update message generated by a control entity, wherein the first BGP update message comprises first metric information of a first segment routing (SR) path, and the first metric information represents quality of the first SR path;
performing, by the first network device, route selection on a plurality of paths to a destination node based on the first metric information, wherein each of the plurality of paths has a same internet protocol (IP) prefix of the destination node, and the plurality of paths comprise the first SR path;
obtaining, by the first network device, a second BGP update message generated by the control entity, wherein the second BGP update message comprises second metric information of a second SR path, and the second metric information represents quality of the second SR path; and
wherein the performing, by the first network device, route selection on a plurality of paths to a destination node based on the first metric information comprises: performing, by the first network device, route selection on the plurality of paths to the destination node based on the first metric information and the second metric information, wherein the plurality of paths further comprise the second SR path.

16. A route selection apparatus, used in a first network device, the apparatus comprising:
a non-transitory memory storing instructions; and
a processor coupled to the non-transitory memory; wherein the instructions, when executed by the processor, cause the apparatus to be configured to:
obtain a first border gateway protocol (BGP) update message generated by a control entity, wherein the first BGP update message comprises first metric information of a first segment routing (SR) path, and the first metric information represents quality of the first SR path;
perform route selection on a plurality of paths to a destination node based on the first metric information, wherein each of the plurality of paths has a same internet protocol (IP) prefix of the destination node, and the plurality of paths comprise the first SR path; and
obtain a second BGP update message generated by the control entity, wherein the second BGP update message comprises second metric information of a second SR path, and the second metric information represents quality of the second SR path, wherein
perform route selection on the plurality of paths to the destination node based on the first metric information and the second metric information, wherein the plurality of paths further comprise the second SR path.

17. A route selection method, comprising:
obtaining, by a first network device, a first border gateway protocol (BGP) update message generated by a control entity, wherein the first BGP update message comprises first metric information of a first segment routing (SR) path, the first metric information represents quality of the first SR path, the first metric information is used for route selection on a plurality of paths to a destination node, each of the plurality of paths has a same internet protocol (IP) prefix of the destination node, and the plurality of paths comprise the first SR path;
flooding, by the first network device, the first metric information; and
obtaining, by the first network device, a second BGP update message generated by the control entity, wherein the second BGP update message comprises second metric information of a second SR path, and the second metric information represents quality of the second SR path, wherein performing route selection on the plurality of paths to the destination node based on the first metric information and the second metric information, wherein the plurality of paths further comprise the second SR path.

18. A route selection apparatus, used in a first network device, wherein the apparatus comprises:
a non-transitory memory storing instructions; and
a processor coupled to the non-transitory memory; wherein the instructions, when executed by the processor, cause the apparatus to be configured to:
obtain a first border gateway protocol (BGP) update message generated by a control entity, wherein the first BGP update message comprises first metric information of a first segment routing (SR) path, the first metric information represents quality of the first SR path, the first metric information is used for route selection on a plurality of paths to a destination node, each of the plurality of paths has a same internet protocol (IP) prefix of the destination node, and the plurality of paths comprise the first SR path;

flood the first metric information; and obtain, by the first network device, a second BGP update message generated by the control entity, wherein the second BGP update message comprises second metric information of a second SR path, and the second metric information represents quality of the second SR path, wherein perform route selection on the plurality of paths to the destination node based on the first metric information and the second metric information, wherein the plurality of paths further comprise the second SR path.

19. The apparatus according to claim 18, wherein the first metric information comprises at least one of the following information: an interior gateway protocol (IGP) metric, a traffic engineering (TE) metric, a delay, or a packet loss rate.

20. A route selection apparatus, used in a control entity, the apparatus comprising:

a non-transitory memory storing instructions; and a processor coupled to the non-transitory memory; wherein the instructions, when executed by the processor, cause the apparatus to be configured to:

determine first metric information of a first segment routing (SR) path, wherein the first metric information represents quality of the first SR path;

generate a first border gateway protocol (BGP) update message, wherein the first BGP update message comprises the first metric information, the first metric information is used for route selection on a plurality of paths, each of the plurality of paths has a same internet protocol (IP) prefix of a destination node, and the plurality of paths comprise the first SR path;

send the first BGP update message to a first network device, wherein the first network device is an ingress node of the first SR path;

determine second metric information of a second SR path, wherein the second metric information represents quality of the second SR path;

generate a second BGP update message, wherein the second BGP update message comprises the second metric information, the second metric information is used for route selection on the plurality of paths, and the plurality of paths comprise the second SR path; and send the second BGP update message to the first network device, wherein the first network device is an ingress node of the second SR path.

21. The apparatus according to claim 20, wherein if an egress node of the first SR path is a second network device, and an egress node of the second SR path is a third network device, next hops of routes corresponding to the IP prefix comprise the second network device and the third network device, the plurality of paths comprise a first path and a second path, the first path comprises the first SR path, and the second path comprises the second SR path.

22. The apparatus according to claim 20, wherein if an egress node of the first SR path and an egress node of the second SR path are both a second network device, a next hop of a route corresponding to the IP prefix comprises the second network device, the plurality of paths comprise a first path and a second path, the first path comprises the first SR path, and the second path comprises the second SR path.

23. The apparatus according to claim 20, wherein if a type of the first SR path is a segment routing policy (SR policy), the first BGP update message is a BGP SR policy packet.

24. The apparatus according to claim 23, wherein if the first SR path comprises at least one candidate path, the first metric information comprises metric information of a working path in the at least one candidate path.

25. The apparatus according to claim 24, wherein the first metric information is carried in a candidate path sub-type-length-value (sub-TLV) field corresponding to the working path in the BGP SR policy packet.

26. The apparatus according to claim 23, further configured to: obtain metric information corresponding to at least one segment list of a working path in the first SR path; and determine the first metric information based on the metric information corresponding to the at least one segment list.

* * * * *